US009965273B2

(12) United States Patent
Yamasaki et al.

(10) Patent No.: US 9,965,273 B2
(45) Date of Patent: May 8, 2018

(54) SIGNAL PROCESSING CIRCUIT

(71) Applicant: Renesas Electronics Corporation, Tokyo (JP)

(72) Inventors: Hiroyuki Yamasaki, Tokyo (JP); Hideyuki Noda, Tokyo (JP); Kan Murata, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days. days.

(21) Appl. No.: 15/360,028

(22) Filed: Nov. 23, 2016

(65) Prior Publication Data

US 2017/0075687 A1    Mar. 16, 2017

Related U.S. Application Data

(63) Continuation of application No. 13/864,834, filed on Apr. 17, 2013, now Pat. No. 9,535,693.

(30) Foreign Application Priority Data

Apr. 18, 2012  (JP) ................................ 2012-094429

(51) Int. Cl.
    *G06F 7/38*     (2006.01)
    *G06F 9/00*     (2006.01)
    (Continued)

(52) U.S. Cl.
    CPC ....... *G06F 9/3001* (2013.01); *G05B 19/0426* (2013.01); *G06F 9/3005* (2013.01);
    (Continued)

(58) Field of Classification Search
    None
    See application file for complete search history.

(56) References Cited

U.S. PATENT DOCUMENTS 4,459,665 A * 7/1984 Miu ...................... G06F 13/362
                                                    710/113
5,842,025 A    11/1998 Joffe
                (Continued)

FOREIGN PATENT DOCUMENTS

JP    2009-116445 A    5/2009

OTHER PUBLICATIONS

Non-Final Office Action dated Dec. 18, 2015 issued in U.S. Appl. No. 13/864,834.

(Continued)

*Primary Examiner* — Michael Sun
(74) *Attorney, Agent, or Firm* — McDermott Will & Emery LLP

(57) ABSTRACT

Provided is a signal processing circuit occupying a small circuit area. A common arithmetic operation element is shared between a plurality of arithmetic operation sequence control units. An arbitration circuit selects, when the plurality of arithmetic operation sequence control units simultaneously generate requests for arithmetic operations to use the common arithmetic operation element, the predetermined sequence control unit based on priority information about the plurality of arithmetic operation sequence control units, causes the common arithmetic operation element to execute the arithmetic operation requested from the selected arithmetic operation sequence control unit, and returns the result of the arithmetic operation to the selected arithmetic operation sequence control unit.

7 Claims, 16 Drawing Sheets

(51) Int. Cl.
  *G06F 9/44* (2006.01)
  *G06F 9/30* (2018.01)
  *G06F 9/38* (2018.01)
  *G05B 19/042* (2006.01)
  *G06F 13/36* (2006.01)
  *G06F 13/40* (2006.01)

(52) U.S. Cl.
  CPC ............ *G06F 9/3851* (2013.01); *G06F 13/36* (2013.01); *G06F 13/4068* (2013.01); *G05B 2219/2207* (2013.01)

(56) References Cited

U.S. PATENT DOCUMENTS

| | | | | |
|---|---|---|---|---|
| 6,205,124 B1 * | 3/2001 | Hamdi | ............... | H04M 3/56 370/260 |
| 6,347,344 B1 * | 2/2002 | Baker | ............... | G06F 13/102 345/501 |
| 8,127,112 B2 * | 2/2012 | Rhoades | ............... | G06F 1/10 712/22 |
| 2001/0030904 A1 * | 10/2001 | Farmwald | ............ | G06F 11/006 365/233.1 |
| 2004/0215773 A1 * | 10/2004 | Strait | ............... | G06F 9/50 709/225 |
| 2007/0299993 A1 | 12/2007 | Vorbach et al. | | |
| 2009/0106467 A1 * | 4/2009 | Kashiwagi | ............ | G06F 9/3885 710/120 |
| 2009/0210653 A1 | 8/2009 | Vorbach et al. | | |
| 2010/0177585 A1 * | 7/2010 | Rubinstein | ......... | G06F 13/1663 365/230.05 |

OTHER PUBLICATIONS

Final Office Action dated Jun. 3, 2016, issued in U.S. Appl. No. 13/864,834.

Notice of Allowance dated Aug. 26, 2016, issued in U.S. Appl. No. 13/864,834.

* cited by examiner

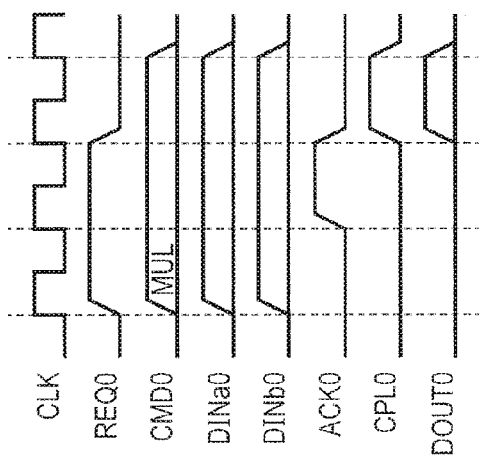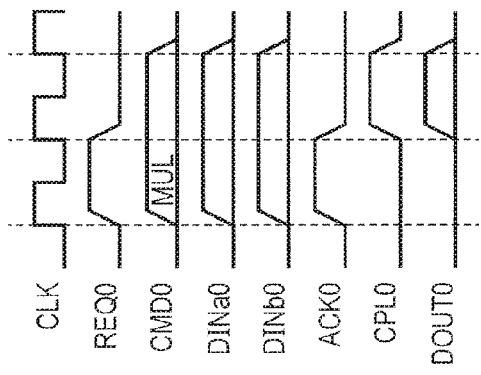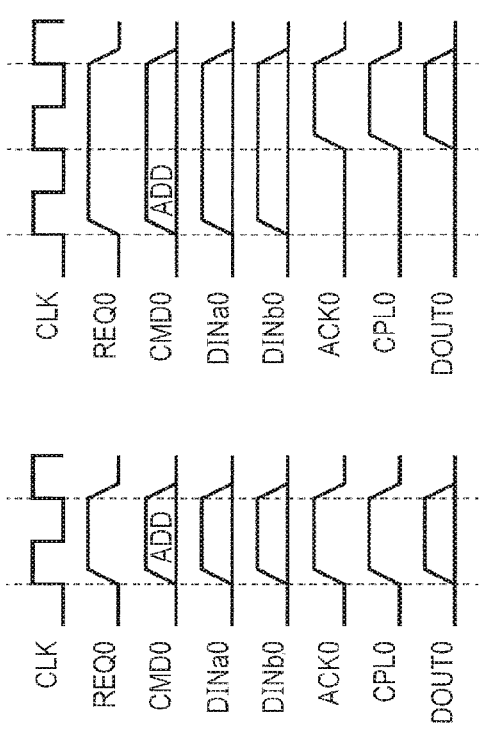

FIG. 12A

| DATA REG | DATA |
|---|---|
| #0 | X[i-0] |
| #1 | X[i-1] |
| #2 | X[i-2] |
| #3 | X[i-3] |
| #4 | 0 |

FIG. 12B

| | CMD | FIRST INPUT SOURCE | SECOND INPUT SOURCE | OUTPUT DESTINATION |
|---|---|---|---|---|
| FIRST INSTRUCTION | SFT | #0 | — | #0 |
| SECOND INSTRUCTION | ADD | #0 | #4 | #4 |
| THIRD INSTRUCTION | SFT | #1 | — | #1 |
| FOURTH INSTRUCTION | ADD | #1 | #4 | #4 |
| FIFTH INSTRUCTION | SFT | #2 | — | #2 |
| SIXTH INSTRUCTION | ADD | #2 | #4 | #4 |
| SEVENTH INSTRUCTION | SFT | #3 | — | #3 |
| EIGHTH INSTRUCTION | ADD | #3 | #4 | #4 |
| NINTH INSTRUCTION | HALT | — | — | — |

SIGNAL PROCESSING CIRCUIT

CROSS-REFERENCE TO RELATED APPLICATIONS

This application is a Continuation of U.S. application Ser. No. 13/864,834 filed Apr. 17, 2013, which in turn claims the benefit of the disclosure of Japanese Patent Application No. 2012-094429 filed on Apr. 18, 2012, the disclosures of which are incorporated herein by reference in their entirety.

BACKGROUND

The present invention relates to a signal processing circuit, and particularly to a signal processing circuit including, e.g., a common arithmetic operation element used commonly by a plurality of programmable sequencers.

Conventionally, a programmable controller capable of executing a plurality of sequence programs in parallel has been known. For example, the programmable controller of Patent Document 1 (Japanese Unexamined Patent Publication No. 2009-116445) includes program execution circuits (3a1 to 3an) which are a plurality of dedicated LSIs as hardware capable of executing a predetermined first instruction included in sequence programs, and a CPU (1) for executing a second instruction which is included in the plurality of independent sequence programs being executed in parallel and which cannot be executed in the program execution circuits. The programmable controller further includes a first transfer means for transferring information items on the at least one second instruction to the CPU (1) in chronological order, and a second transfer means for transferring the information items on the second instruction executed by the CPU (1) to the program execution circuits. The programmable controller performs priority control in which, when a plurality of requests to write to a FIFO are simultaneously given from the plurality of program execution circuits, the request from the program execution circuit having a higher priority is prioritized.

RELATED ART DOCUMENTS

Patent Documents

[Patent Document 1]
Japanese Unexamined Patent Publication No. 2009-116445

SUMMARY

In the programmable controller of Patent Document 1, the plurality of dedicated LSIs need to be mounted. Since a dedicated LSI uses a method in which an arithmetic operation element corresponding to the type of arithmetic processing to be executed is mounted, the dedicated LSI is capable of short-time processing. However, mounting an arithmetic operation element for each one of the dedicated LSIs results in the problem of an increased circuit.

Other problems and novel features of the present invention will become apparent from a statement in the present specification and the accompanying drawings.

A signal processing circuit of an embodiment includes a common arithmetic operation element shared by a plurality of sequence control units and an arbitration circuit. When the plurality of sequence control units simultaneously generate requests for arithmetic operations to use the common arithmetic operation element, the arbitration circuit selects any one of the sequence control units based on priority information about each of the sequence control units, causes the common arithmetic operation element to execute the arithmetic operation requested from the selected sequence control unit, and returns the result of the arithmetic operation to the selected sequence control unit.

The signal processing circuit of the embodiment allows a reduction in circuit area.

BRIEF DESCRIPTION OF THE DRAWINGS

FIGS. 5A to 5D are time charts showing processing from an arithmetic operation request through a reception response to a completion response;

FIG. 12A is a view showing an example of data items stored in the data REG #0 to data REG #4 of each of data REG groups 55_0 and 55_1, and FIG. 12B is a view showing a group of instructions for executing a fourth-order FIR filtering process;

DETAILED DESCRIPTION

Hereinbelow, a description will be given of embodiments of the present invention with reference to the drawings.

First Embodiment

Figure 1:
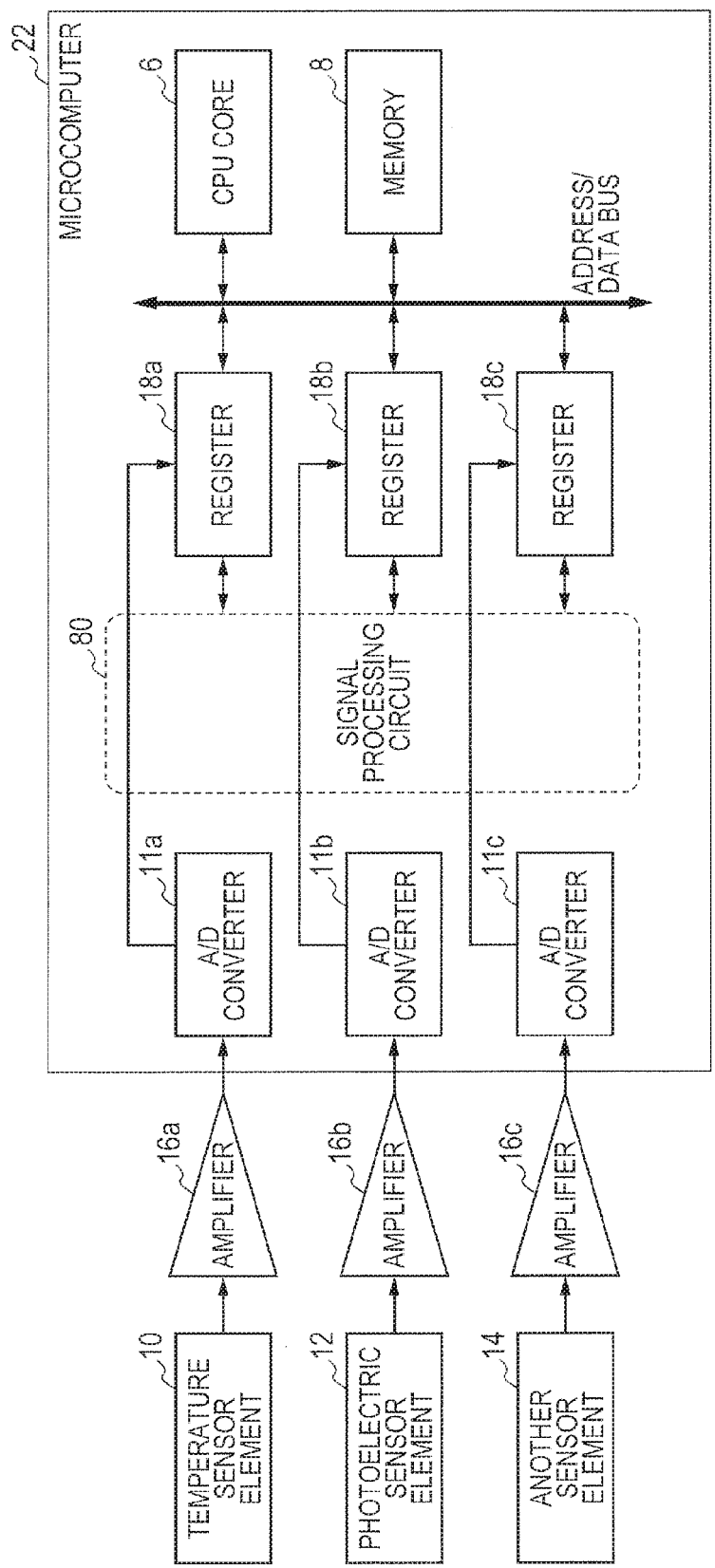
FIG. 1 is a view showing an example of a sensor system having a plurality of sensing functions.

FIG. 1 is a view showing an example of a sensor system having a plurality of sensing functions.

The sensor system of FIG. 1 includes a temperature sensor element 10 for detecting an ambient temperature and converting the ambient temperature to an electric signal, a photoelectric sensor element 12 for detecting ambient light and converting the ambient light to an electric signal, another sensor element 14, an amplifier 16a for amplifying the signal from the temperature sensor element 10, an amplifier 16b for amplifying the signal from the photoelectric sensor element 12, an amplifier 16c for amplifying the signal from the other sensor element 14, and a microcomputer 22.

The microcomputer 22 includes A/D converters 11a, 11b, and 11c, a signal processing circuit 80, registers 18a, 18b, and 18c, a CPU core 6 for controlling the entire microcomputer 22, and a memory 8 for storing data.

The A/D converters 11a, 11b, and 11c convert respective analog data items from the amplifiers 16a, 16b, and 16c to digital data items and store the digital data items in the registers 18a, 18b, and 18c.

The signal processing circuit 80 executes various types of signal processing on the data items stored in the registers 18a, 18b, and 18c and store the results of processing in the registers 18a, 18b, and 18c. When the sensor elements 10, 12, and 14 have different output characteristics of electric energy, the signal processing circuit 80 performs the process of amplifying an extremely weak signal and a FIR (Finite Impulse Response) filtering process, an IIR (Infinite Impulse Response) filtering process, or the like for noise removal. When the sensor elements 10, 12, and 14 have complicatedly curved output characteristics with respect to changes in ambient energy to be detected, the signal processing circuit 80 also performs a correction process so as to linearize the output characteristics.

(Schematic Configuration of Signal Processing Circuit)

Figure 2:
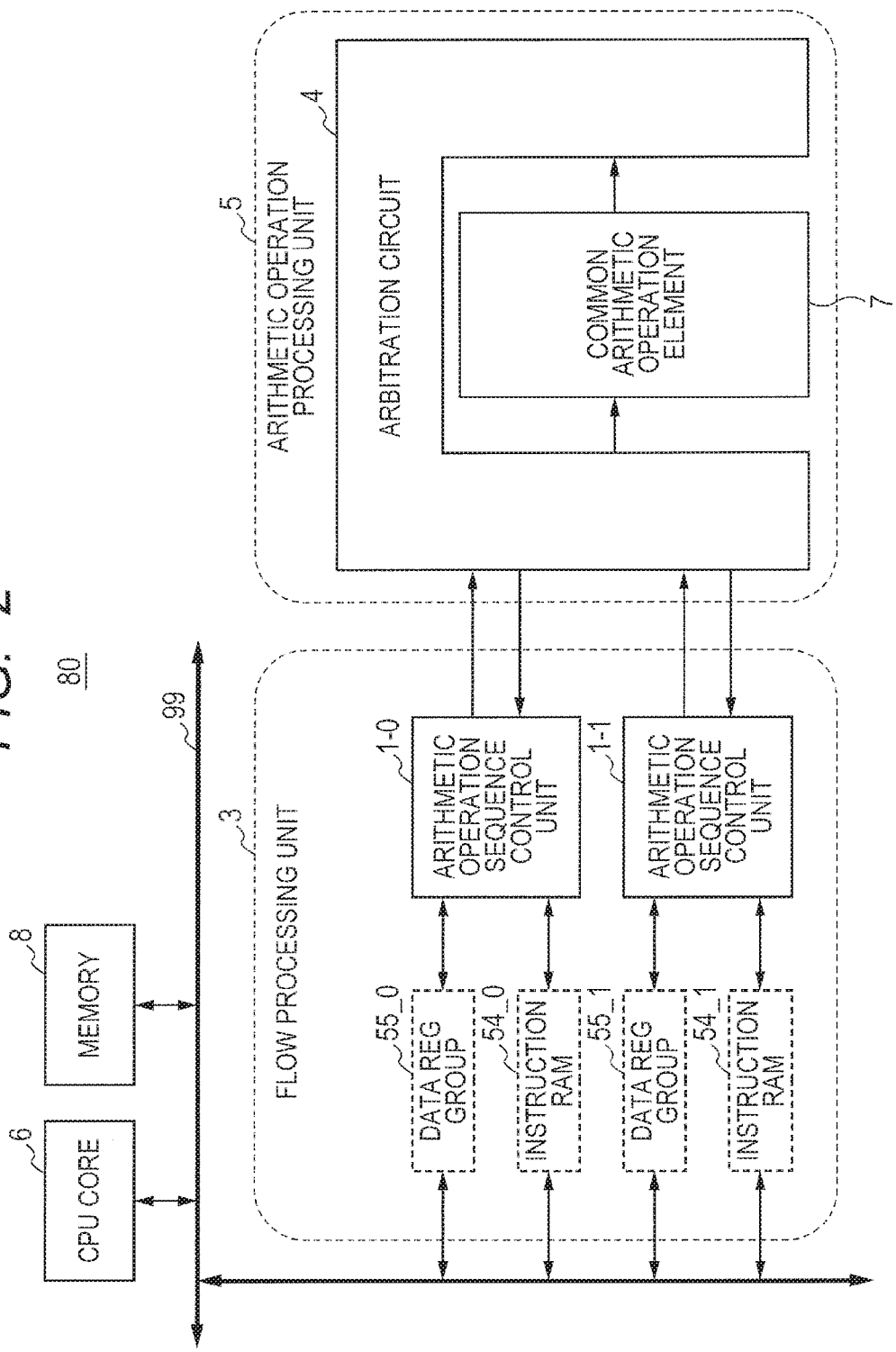
FIG. 2 is a view showing a schematic configuration of the signal processing circuit of FIG. 1.

FIG. 2 is a view showing a schematic configuration of the signal processing circuit of FIG. 1.

Referring to FIG. 2, the signal processing circuit 80 includes a flow processing unit 3 and an arithmetic operation processing unit 5.

The flow processing unit 3 includes data REG groups 55_0 and 55_1, instruction RAMs 54_0 and 54_1, and arithmetic operation sequence control units 1-0 and 1-1.

The data REG groups 55_0 and 55_1 store data output from the CPU core 6 to be subjected to an arithmetic operation in the arithmetic operation processing unit 5 or data showing the result of the arithmetic operation in the arithmetic operation processing unit 5.

The instruction RAMs 54_0 and 54_1 store a plurality of instructions output from the CPU core 6. The instructions include specification of "Arithmetic Operation Type and Data Input/Output". The setting and changing of the instruction (specification of "Arithmetic Operation Type and Data Input/Output") can be considered to be equivalent to the implementation of digital signal processing and can be performed in a shorter design work period than that for the implementation of a dedicated circuit.

The instruction RAMs 54_0 and 54_1 and the data REG groups 55_0 and 55_1 are mapped in the address space of the CPU core 6 to enable read/write operations from the CPU core 6 through a bus 99.

The arithmetic operation sequence control unit 1-0 reads the data stored in the data REG group 55_0 based on the instruction stored in the instruction RAM 54_0 and requests an arithmetic operation on the read data of the arithmetic operation processing unit 5. The arithmetic operation sequence control unit 1-0 stores data showing the result of the arithmetic operation executed in the arithmetic operation processing unit 5 in the data REG group 55_0.

The arithmetic operation sequence control unit 1-1 reads the data stored in the data REG group 55_1 based on the instruction stored in the instruction RAM 54_1 and requests an arithmetic operation on the read data of the arithmetic operation processing unit 5. The arithmetic operation sequence control unit 1-1 stores data showing the result of the arithmetic operation executed in the arithmetic operation processing unit 5 in the data REG group 55_1.

The arithmetic operation processing unit 5 includes an arbitration circuit 4 and a common arithmetic operation element 7.

The common arithmetic operation element 7 is shared between the arithmetic operation sequence controls units 1-0 and 1-1. By thus sharing the arithmetic operation element between the plurality of arithmetic operation sequence control units, it is possible to reduce the number of the mounted arithmetic operation elements and consequently reduce the area scale.

When the arithmetic operation sequence control units 1-0 and 1-1 simultaneously generate arithmetic operation requests to use the common arithmetic operation element 7, the arbitration circuit 4 selects either one of the arithmetic operation sequence control units based on priority information about the arithmetic operation sequence control units 1-0 and 1-1, causes the common arithmetic operation element 7 to execute the arithmetic operation requested from the selected arithmetic operation sequence control unit, and returns the result of the arithmetic operation to the selected arithmetic operation sequence control unit.

(Details of Signal Processing Circuit)

Figure 3:
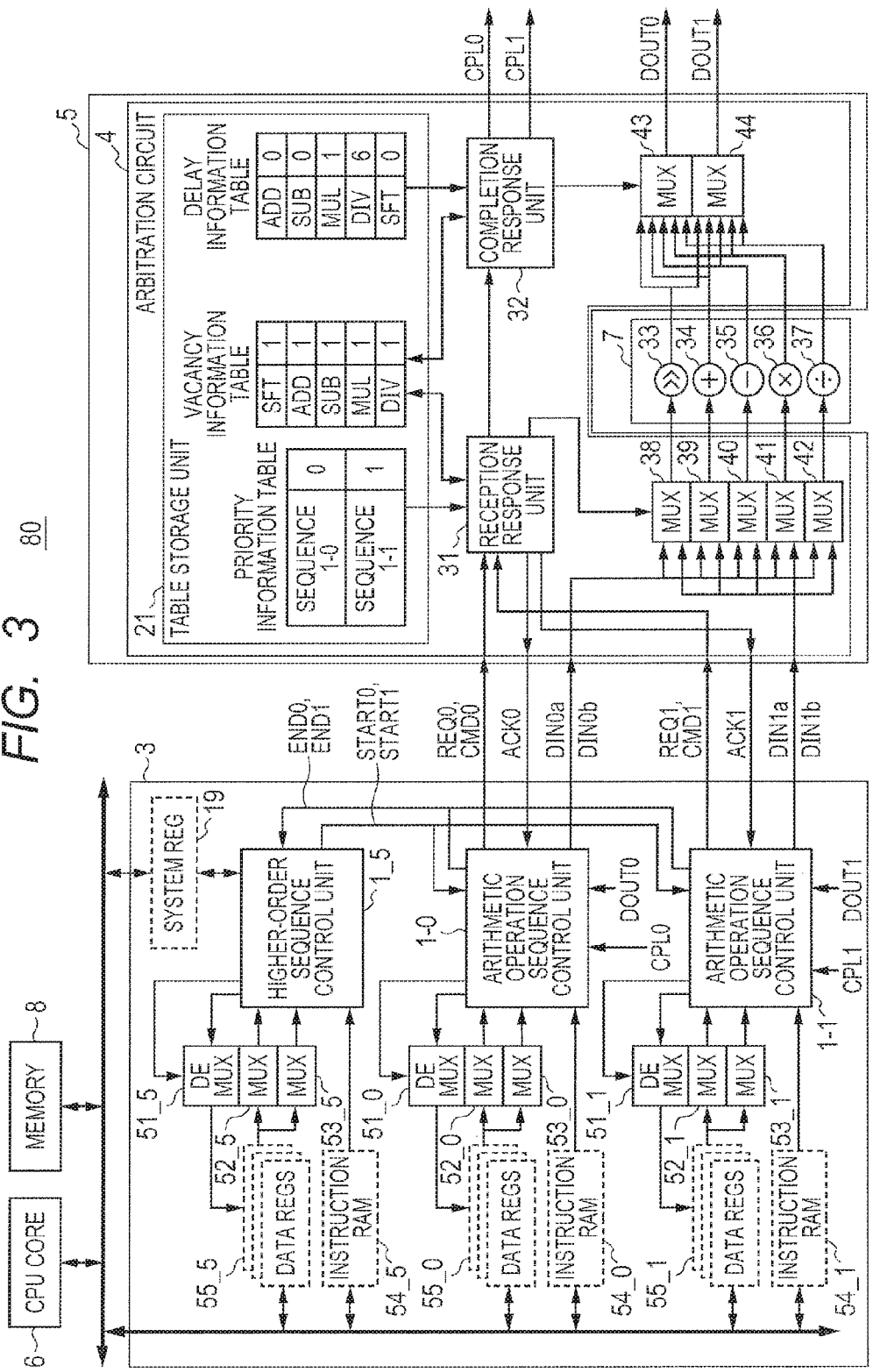
FIG. 3 is a view showing the details of the signal processing circuit of a first embodiment.

FIG. 3 is a view showing the details of the signal processing circuit of a first embodiment.

The signal processing circuit 80 includes the flow processing unit 3 and the arithmetic operation processing unit 5.

The flow processing unit 3 includes the data REG groups 55_0, 55_1, and 55_5, instruction RAMs 54_0, 54_1, and 54_5, a higher-order sequence control unit 1_5, the arithmetic operation sequence control units 1-0 and 1-1, DE_MUXs 51_0, 51_1, and 51_5, MUXs 52_0, 52_1, 52_5, 53_0, 53_1, and 53_5, and a system REG 19.

The system REG 19 stores instructions and data which are related to control of a system and output from the CPU core 6.

The higher-order sequence control unit 1_5 decodes the instruction read from the instruction RAM 54_5 and outputs sequence activation signals START0 and START1 each indicating the start of processing to the respective arithmetic operation sequence control units 1-0 and 1-1 in accordance with the decoded instruction. The higher-order sequence control unit 1_5 receives sequence completion signals END0 and END1 each indicating the end of processing from the respective arithmetic operation sequence control units 1-0 and 1-1. Also, the higher-order sequence control unit 1_5 selects any of the plurality of registers included in the data REG group 55_5 in accordance with the decoded instruction and causes the MUX 52_5 to select the data output from the selected register as an input thereto. Also, the higher-order sequence control unit 1_5 selects any of the plurality of registers included in the data REG group 55_5 based on the decoded instruction and causes the MUX 53_5 to select the data output from the selected register as an input thereto. The higher-order sequence control unit 1_5 selects any of the plurality of registers included in the data REG group 55_5 based on the decoded instruction and causes the DEMUX 51_5 to select the selected register as an output destination to which the data is output from the arithmetic operation processing unit 5.

The arithmetic operation sequence control unit 1-0 decodes the instruction read from the instruction RAM 54_0 and outputs an arithmetic operation request signal REQ0 and an arithmetic operation type signal CMD0 in accordance with the decoded instruction. The arithmetic operation sequence control unit 1-0 also selects any of the plurality of registers included in the data REG group 55_0 in accordance with the decoded instruction and causes the MUX 52_0 to select the data output from the selected register as an input thereto. Also, the arithmetic operation sequence control unit 1-0 selects any of the plurality of registers included in the data REG group 55_0 in accordance with the decoded instruction and causes the MUX 53_0 to select the data output from the selected register as an input thereto. However, when the arithmetic operation type of the decoded instruction is a SFT, the arithmetic operation sequence control unit 1-0 does not perform a control operation for causing the MUX 53_0 to select the output data. The arithmetic operation sequence control unit 1-0 outputs the data sent from the MUX 52_0 as a first data item DIN0$a$ and outputs the data sent from the MUX 53_0 as a second data item DIN0$b$. Also, the arithmetic operation sequence control unit 1-0 selects any of the registers included in the data REG group 55_0 in accordance with the decoded instruction and causes the DEMUX 51_0 to select the selected register as an output destination to which an arithmetic operation result DOUT0 is output from the arithmetic operation processing unit 5. The arithmetic operation sequence control unit 1-0 receives a response signal ACK0, a completion signal CPL0, and the arithmetic operation result DOUT0 from the arithmetic operation processing unit 5. The arithmetic operation sequence control unit 1-0 receives the sequence activation signal START0 indicating the start of processing from the higher-order sequence control unit 1_5. When the read instruction is a HALT instruction, the arithmetic operation sequence control unit 1-0 outputs the sequence completion signal END0 to the higher-order sequence control unit 1_5.

The arithmetic operation sequence control unit 1-1 decodes the instruction read from the instruction RAM 54_1 and outputs an arithmetic operation request signal REQ1 and an arithmetic operation type signal CMD1 in accordance with the decoded instruction. The arithmetic operation sequence control unit 1-1 also selects any of the plurality of registers included in the data REG group 55_1 in accordance with the decoded instruction and causes the MUX 52_1 to select the data output from the selected register as an input thereto. Also, the arithmetic operation sequence control unit 1-1 selects any of the plurality of registers included in the data REG group 55_1 in accordance with the decoded instruction and causes the MUX 53_1 to select the data output from the selected register as an input thereto. However, when the arithmetic operation type of the decoded instruction is the SFT, the arithmetic operation sequence control unit 1-1 does not perform a control operation for causing the MUX 53_1 to select the output data. The arithmetic operation sequence control unit 1-1 outputs the data sent from the MUX 52_1 as a first data item DIN1$a$ and outputs the data sent from the MUX 53_1 as a second data item DIN1$b$. Also, the arithmetic operation sequence control unit 1-1 selects any of the registers included in the data REG group 55_1 in accordance with the decoded instruction and causes the DEMUX 51_1 to select the selected register as an output destination to which an arithmetic operation result DOUT1 is output from the arithmetic operation processing unit 5. The arithmetic operation sequence control unit 1-1 receives a response signal ACK1, a completion signal CPL1, and the arithmetic operation result DOUT1 from the arithmetic operation processing unit 5. The arithmetic operation sequence control unit 1-1 receives the sequence activation signal START1 indicating the start of processing from the higher-order sequence control unit 1_5. When the read instruction is the HALT instruction, the arithmetic operation sequence control unit 1-1 outputs the sequence completion signal END1 to the higher-order sequence control unit 1_5.

The arithmetic operation processing unit 5 includes the arbitration circuit 4 and the common arithmetic operation element 7.

When the arithmetic operation sequence control unit 1-0 and 1-1 simultaneously generate requests for arithmetic operations of the same arithmetic operation type, as long as the common arithmetic operation element 7 corresponding to the arithmetic operation type is out of use, the arbitration circuit selects either one of the arithmetic operation sequence control units 1-0 and 1-1 based on the priority information about the sequence control units. The arbitration circuit 4 causes the common arithmetic operation element 7 corresponding to the arithmetic operation type related to the arithmetic operation request to execute the arithmetic operation requested from the selected arithmetic operation sequence control unit and returns the result of the arithmetic operation to the selected arithmetic operation sequence control unit.

The arbitration circuit 4 includes a table storage unit 21, a reception response unit 31, a completion response unit 32, and MUXs 38 to 44.

The table storage unit 21 stores a priority information table, a vacancy information table, and a delay information table.

The priority information table determines priorities when the arithmetic operation sequence control units 1-0 and 1-1 compete against each other for processing. As the priority of the arithmetic operation sequence control unit has a smaller numerical value, processing therefor is prioritized. In the example FIG. 3, the priority of the arithmetic operation sequence control unit 1-0 is set to "0" and the priority of the arithmetic operation sequence control unit 1-1 is set to "1". Accordingly, processing for the arithmetic operation sequence control unit 1-0 takes priority over processing for the arithmetic operation sequence control unit 1-1.

The vacancy information table determines state values showing whether or not the arithmetic operation elements 33 to 37 are in use. When the arithmetic operation elements 33 to 37 are in use, the state values are "0". When the arithmetic operation elements 33 to 37 are out of use, the state values are "1". In the example of FIG. 3, each of a shift operation element (SFT) 33, an adder (ADD) 34, a subtractor (SUB) 35, a multiplier (MUL) 36, and a divider (DIV) 37 has the state value of "1" so that each of the arithmetic operation elements 33 to 37 is out of use.

The delay information table determines the delay value of each of the arithmetic operation elements 33 to 37. When the delay value is "n", it shows that an arithmetic operation ends in (n+1) clocks. That is, the next arithmetic operation should wait for a period corresponding to n clocks.

In the example of FIG. 3, the shift operation element (SFT) 33, the adder (ADD) 34, and the subtractor (SUB) 35 have the delay values of "0" so that an arithmetic operation in each of the arithmetic operation elements ends in 1 clock (there is no wait time). The delay value of the multiplier (MUL) 36 is "1" so that an arithmetic operation in the multiplier 36 ends in 2 clocks (the next arithmetic operation should wait for a period corresponding to 1 clock). The delay value of the divider (DIV) 37 is "6" so that an arithmetic operation in the divider 37 ends in 7 clocks (the next arithmetic operation should wait for a period corresponding to 6 clocks).

The reception response unit 31 receives the arithmetic operation request signals REQ0 and REQ1, the arithmetic operation type signals CMD0 and CMD1, the first data items DIN0*a* and DIN1*a*, and the second data items DIN0*b* and DIN1*b* from the arithmetic operation sequence control units 1-0 and 1-1.

On receiving one arithmetic operation request signal REQi (i=0 or 1), the reception response unit 31 refers to the vacancy information table to examine whether or not the arithmetic operation element specified by an arithmetic operation type signal CMDi is in use. When the arithmetic operation element is out of use, the reception response unit 31 receives the arithmetic operation request from the arithmetic operation sequence control unit 1-*i*. When the arithmetic operation element is in use, the reception response unit 31 does not receive the arithmetic operation request from the arithmetic operation sequence control unit 1-*i*.

On simultaneously receiving the two arithmetic operation request signals REQ0 and REQ1, the reception response unit 31 examines whether or not the arithmetic operation type signals CMD0 and CMD1 are the same. When the arithmetic operation type signals CMD0 and CMD1 are different, the reception response unit 31 refers to the vacancy information table to examine whether or not the arithmetic operation element specified by the arithmetic operation type signal CMD0 is in use. When the arithmetic operation element is out of use, the reception response unit 31 receives the arithmetic operation request from the arithmetic operation sequence control unit 1-0. When the arithmetic operation element is in use, the reception response unit 31 does not receive the arithmetic operation request from the arithmetic operation sequence control unit 1-0. Also, the reception response unit 31 refers to the vacancy information table to examine whether or not the arithmetic operation element specified by the arithmetic operation type signal CMD1 is in use. When the arithmetic operation element is out of use, the reception response unit 31 receives the arithmetic operation request from the arithmetic operation sequence control unit 1-1. When the arithmetic operation element is in use, the reception response unit 31 does not receive the arithmetic operation request from the arithmetic operation sequence control unit 1-1.

On the other hand, when the arithmetic operation type signals CMD0 and CMD1 are the same, the reception response unit 31 refers to the vacancy information table to examine whether or not the arithmetic operation element specified by the arithmetic operation type signal CMD0 (CMD1) is in use. When the arithmetic operation element is in use, the reception response unit 31 does not receive the arithmetic operation requests from the arithmetic operation sequence control units 1-0 and 1-1. When the arithmetic operation element is out of use, the reception response unit 31 refers to the priority information table and selects the one of the arithmetic operation sequence control units 1-0 and 1-1 which has a higher priority. The reception response unit 31 receives the arithmetic operation request from the selected arithmetic operation sequence control unit and does not receive the arithmetic operation request from the unselected arithmetic operation sequence control unit.

The reception response unit 31 returns the response signal ACK0 or ACK1 to the arithmetic operation sequence control unit from which the request has been received. The reception response unit 31 outputs the first data item and the second data item which are output from the arithmetic operation sequence control unit from which the request has been received to the one of the arithmetic operation elements 33 to 37 indicated by the arithmetic operation type signal CMD output from the arithmetic operation sequence control unit from which the request has been received.

When the arithmetic operation type signal CMD0 or CMD1 is sent from the reception response unit 31 to the completion response unit 32, the completion response unit 32 refers to the delay information table to specify a delay time in the arithmetic operation element indicated by the arithmetic operation type signal CMD0 or CMD1. When the specified delay time has elapsed, the completion response unit 32 returns the completion signal CPL0 or CPL1 to the arithmetic operation sequence control unit 1-0 or 1-1. Also, the completion response unit 32 sets vacancy information about the arithmetic operation unit indicated by the arithmetic operation type signal CMD0 or CMD1 to "1" indicating the out-of-use state. The details of processing in the completion response unit 32 will be described later.

The MUX 38 receives the first data item DIN0*a* from the arithmetic operation sequence control unit 1-0, receives the first data item DIN1*a* from the arithmetic operation sequence control unit 1-1, selects either of the first data items DIN0*a* and DIN1*a* in accordance with the specification by the reception response unit 31, and outputs the selected first data item to the shift operation element 33. The MUX 39 receives a pair set of the first data item DIN0*a* and the second data item DIN0*b* from the arithmetic operation sequence control unit 1-0, receives a pair set of the first data item DIN1*a* and the second data item DIN1*b* from the arithmetic operation sequence control unit 1-1, and outputs either of the pair sets to the adder 34. The MUX 40 receives the pair set of the first data item DIN0*a* and the second data item DIN0*b* from the arithmetic operation sequence control unit 1-0, receives the pair set of the first data item DIN1*a* and the second data item DIN1*b* from the arithmetic operation sequence control unit 1-1, and outputs either of the pair sets to the subtractor 35. The MUX 41 receives the pair set of the first data item DIN0*a* and the second data item DIN0*b* from the arithmetic operation sequence control unit 1-0, receives the pair set of the first data item DIN1*a* and the second data item DIN1*b* from the arithmetic operation sequence control unit 1-1, and outputs either of the pair sets to the multiplier 36. The MUX 42 receives the pair set of the first data item DIN0*a* and the second data item DIN0*b* from the arithmetic operation sequence control unit 1-0, receives the pair set of the first data item DIN1*a* and the second data item DIN1*b* from the arithmetic operation sequence control unit 1-1, and outputs either of the pair sets to the divider 37.

The common arithmetic operation element 7 is provided for each of the arithmetic operation types on a one-to-one basis. That is, the common arithmetic operation element 7 includes the shift operation element 33 for a 2-bit shift operation, the adder 34 for addition, the subtractor 35 for subtraction, the multiplier 36 for multiplication, and the divider 37 for division.

The shift operation element 33 performs a 2-bit right shift operation on the signal output from the MUX 38 when the arithmetic operation type is the SFT and outputs the resulting signal to the MUXs 43 and 44. The adder 34 executes addition on the pair set (first data item+second data item) output from the MUX 39 when the arithmetic operation type is ADD (addition) and outputs the result of the addition to the MUXs 43 and 44. The subtractor 35 executes subtraction on the pair set (first data item−second data item) output from the MUX 40 when the arithmetic operation type is SUB (subtraction) and outputs the result of the subtraction to the MUXs 43 and 44. The multiplier 36 executes multiplication on the pair set (first data item×second data item) output from the MUX 41 and outputs the result of the multiplication to the MUXs 43 and 44. The divider 37 executes division on the pair set (first data set÷second data set) output from the MUX 42 and outputs the result of the division to the MUXs 43 and 44.

The MUX 43 outputs any one of the signals output from the five arithmetic operation elements 33 to 37 as the arithmetic operation result DOUT0 to the arithmetic operation sequence control unit 1-0 in accordance with the instruction from the completion response unit 32. The MUX 44 outputs any one of the signals output from the five arithmetic operation elements 33 to 37 as the arithmetic operation result DOUT1 to the arithmetic operation sequence control unit 1-1 in accordance with the instruction from the completion response unit 32.

(Arithmetic Operation Sequence Control Units)

Figure 4:
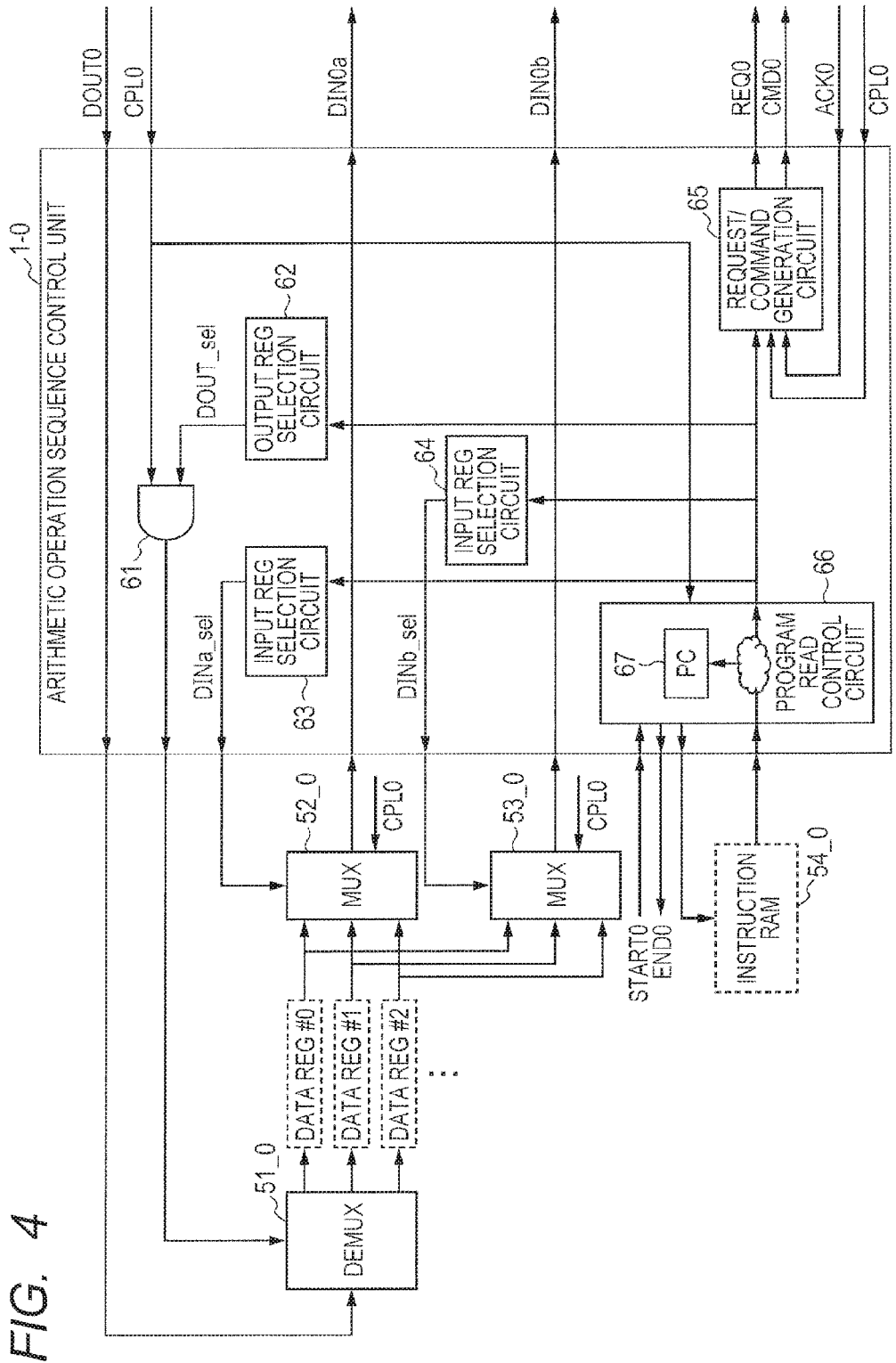
FIG. 4 is a view showing a detailed configuration of an arithmetic operation sequence control unit 1-0.

FIG. 4 is a view showing a detailed configuration of the arithmetic operation sequence control unit 1-0. The arithmetic operation sequence control unit 1-1 also has the same configuration.

On receiving the sequence activation signal START0 from the higher-order sequence control unit 1_5, a program read control circuit 66 successively reads the instructions in the instruction RAM 54_0 in accordance with the indication of a program counter (PC) 67. Each of the instructions includes the specification of "Arithmetic Operation Type", "First Input Source Data Register", "Second Input Source Data Register", and "Output Destination Data Register". However, when the "Arithmetic Operation Type" is the SFT (2-bit right shift), the "Second Input Source Data Register" is not specified. When the read instruction is the HALT instruction, the program read control circuit 66 sends the sequence completion signal END0 to the higher-order sequence control unit 1_5. On each receipt of the completion signal CPL0, the program read control circuit 66 reads the next instruction from the instruction RAM 54_0.

The input REG selection circuit 63 outputs a first input selection signal DINa_sel to the MUX 52_0 in accordance with the specification of the "First Input Source Data Register" included in the read instruction. The MUX 52_0 selects the data item in any of the data REGs #0, #1, #2, . . . in accordance with the first input selection signal DINa_sel and outputs the selected data item as the first data item DIN0a to the arithmetic operation processing unit 5. The MUX 52_0 continues to output the first data item DIN0a till it receives the response signal CPL0.

The input REG selection circuit 64 outputs a second input selection signal DINb_sel to the MUX 53_0 in accordance with the specification of the "Second Input Source Data Register" included in the read instruction. The MUX 53_0 selects the data item in any of the data REGs #0, #1, #2, . . . in accordance with the second input selection signal DINb_sel and outputs the selected data item as the second data item DIN0b to the arithmetic operation processing unit 5. The MUX 53_0 continues to output the second data item DIN0b till it receives the response signal CPL0.

The output REG selection circuit 62 outputs an output selection signal DOUT_sel to a logical AND circuit 61 in accordance with the specification of the "Output Destination Data Register" included in the read instruction. The logical AND circuit 61 outputs the logical AND of the output selection signal DOUT_sel and the completion signal CPL0 as a selection signal SEL to the DEMUX 51_0. That is, upon receiving the completion signal CPL0 (when CPL0 is activated to the H level), the DEMUX 51_0 is controlled by the output selection signal DOUT_sel. The DEMUX 51_0 outputs the arithmetic operation result DOUT0 from the arithmetic operation processing unit 5 to any of the data REGs #0, #1, #2, . . . in accordance with the selection signal SEL.

A request/command generation circuit 65 continues to output the arithmetic operation request signal REQ0 to the arbitration circuit 4 till it receives the response signal ACK0. The request/command generation circuit 65 continues to output the arithmetic operation type signal CMD0 to the arbitration circuit 4 till it receives the completion signal CPL0.

(Processing Timing)

FIGS. 5A to 5D are time charts showing processing from an arithmetic operation request through a reception response to a completion response.

FIG. 5A is a view showing a processing timing when the arithmetic operation requests do not compete, and the arithmetic operation type is an arithmetic operation without delay.

When the arithmetic operation requests do not compete, after the arithmetic operation request signal REQ0, the response signal ACK0 is returned immediately. When the arithmetic operation type is the arithmetic operation without delay, after the response signal ACK0 is returned, the completion signal CPL0 is returned immediately.

FIG. 5B is a view showing a processing timing when the arithmetic operation requests compete, and the arithmetic operation type is the arithmetic operation without delay.

When the arithmetic operation requests compete, after the arithmetic operation request signal REQ0, the response signal ACK0 is not returned immediately. In this example, after a delay of only one clock, the response signal ACK0 is returned. When the arithmetic operation type is the arithmetic operation without delay, after the response signal ACK0 is returned, the completion signal CPL0 is returned immediately.

FIG. 5C is a view showing a processing timing when the arithmetic operation requests do not compete, and the arithmetic operation type is an arithmetic operation with delay.

When the arithmetic operation requests do not compete, after the arithmetic operation request signal REQ0, the response signal ACK0 is returned immediately. When the arithmetic operation type is the arithmetic operation with delay, the return of the completion signal CPL0 is delayed from the time when the response signal ACK0 is returned by a period corresponding to the clocks shown by the delay information. In this example, after a delay of only one clock, the completion signal CPL0 is returned.

FIG. 5D is a view showing a processing timing when the arithmetic operation requests compete, and the arithmetic operation type is the arithmetic operation with delay.

When the arithmetic operation requests compete, after the arithmetic operation request signal REQ0, the response signal ACK0 is not returned immediately. In this example, after a delay of only one clock, the response signal ACK0 is returned. When the arithmetic operation type is the arithmetic operation with delay, the return of the completion signal CPL0 is delayed from the time when the response signal ACK0 is returned by a period corresponding to the clocks shown by the delay information. In this case, after a delay of only one clock, the completion signal CPL0 is returned.

(Operation of Program Read Control Circuit)

Figure 6:
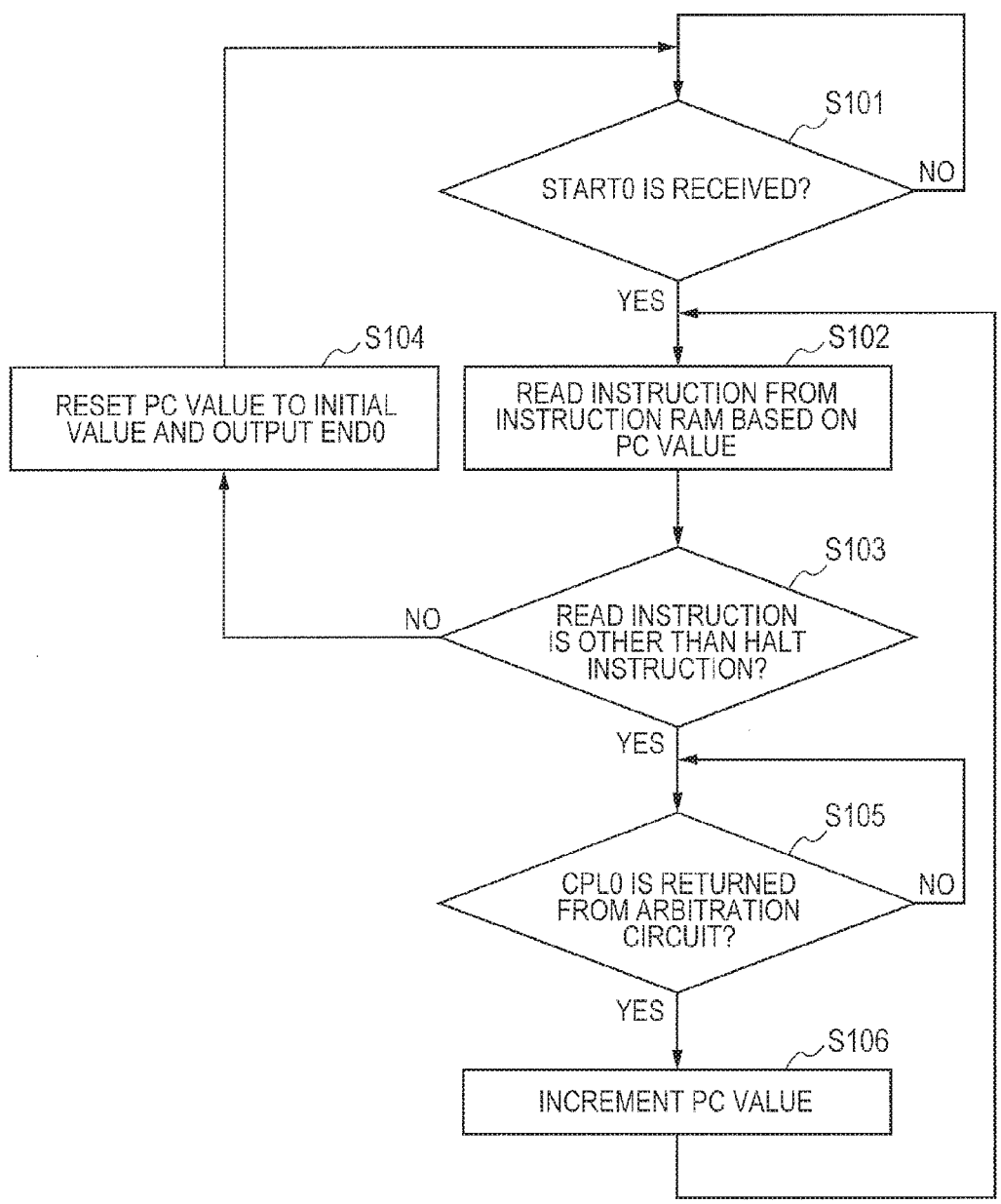
FIG. 6 is a flow chart showing an operation procedure for a program read control circuit.

FIG. 6 is a flow chart showing an operation procedure for the program read control circuit of FIG. 4.

Referring to FIG. 6, first, in the case of receiving the sequence activation signal START0 from a higher-order sequence control unit 15_0 (YES in Step S101), the program read control circuit 66 reads an instruction from the instruction RAM 54_0 based on the value of the program counter 67 (Step S102).

When the read instruction is other than the HALT instruction (YES in Step S103) and when the completion signal CPL0 is returned from the arbitration circuit 4 (YES in Step S105), the program read control circuit 66 then increments the value of the program counter 67 (Step S106).

On the other hand, when the read instruction is the HALT instruction (NO in Step S103), the program read control circuit 66 resets the value of the program counter 67 to an initial value and outputs the sequence completion signal END0 to the higher-order sequence control unit 15_0.

(Operation of Request/Command Generation Circuit)

Figure 7:
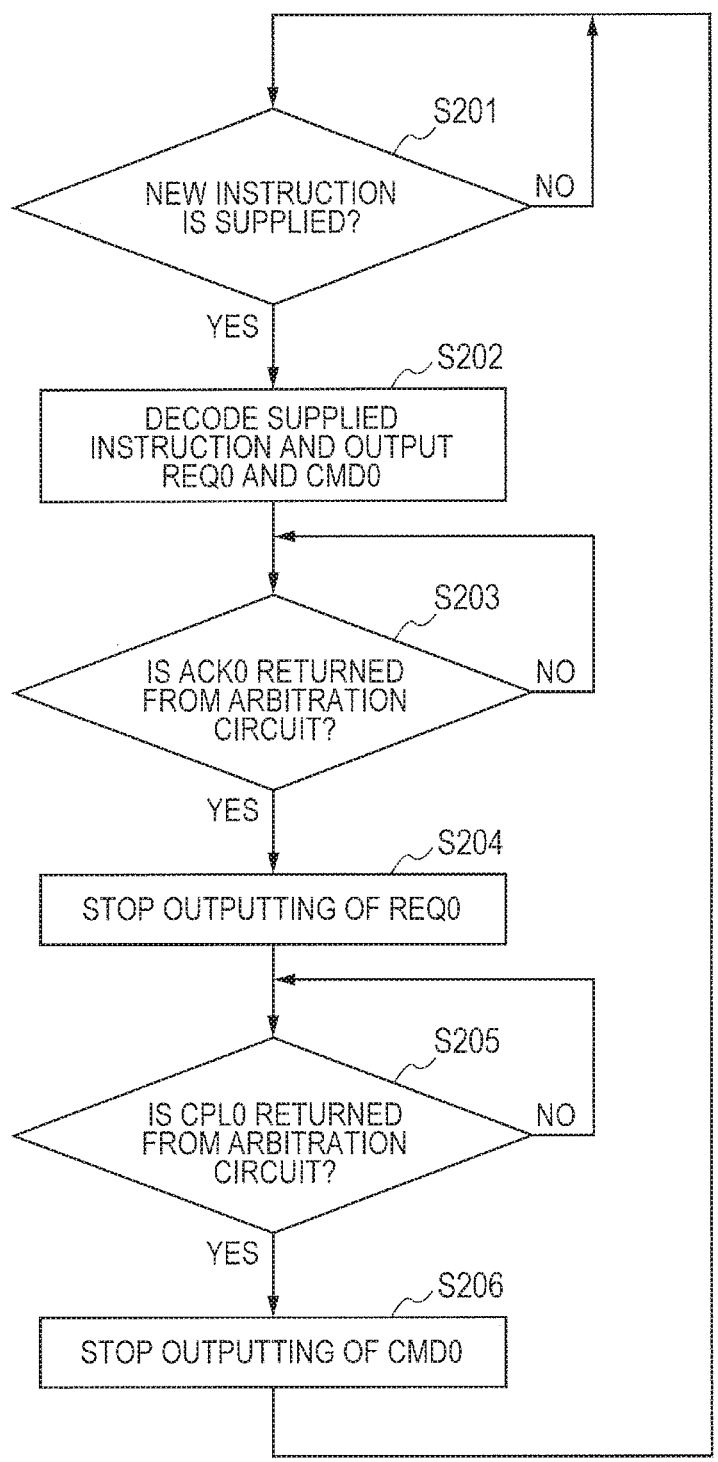
FIG. 7 is a flow chart showing an operation procedure for a request/command generation circuit.

FIG. 7 is a flow chart showing an operation procedure for the request/command generation circuit of FIG. 4.

First, when a new instruction is supplied thereto from the program read control circuit 66 (YES in Step S201), the request/command generation circuit 65 decodes the supplied instruction and outputs the arithmetic operation request signal REQ0 and the arithmetic operation type signal CMD0 to the arbitration circuit 4 based on the result of the decoding (Step S202).

In the case of receiving the response signal ACK0 from the arbitration circuit 4 (YES in Step S203), the request/command generation circuit 65 stops outputting the arithmetic operation request signal REQ0. However, when a new instruction (instruction other than the HALT instruction) is supplied thereto in the next cycle, the request/command generation circuit 65 continues to output the arithmetic operation request signal REQ0 (Step S204).

In the case of receiving the completion signal CPL0 from the arbitration circuit 4 (YES in Step S205), the request/command generation circuit 65 stops outputting the arithmetic operation type signal CMPD0 (Step S206).

(Operations of Input REG Selection Circuits)

Figure 8:
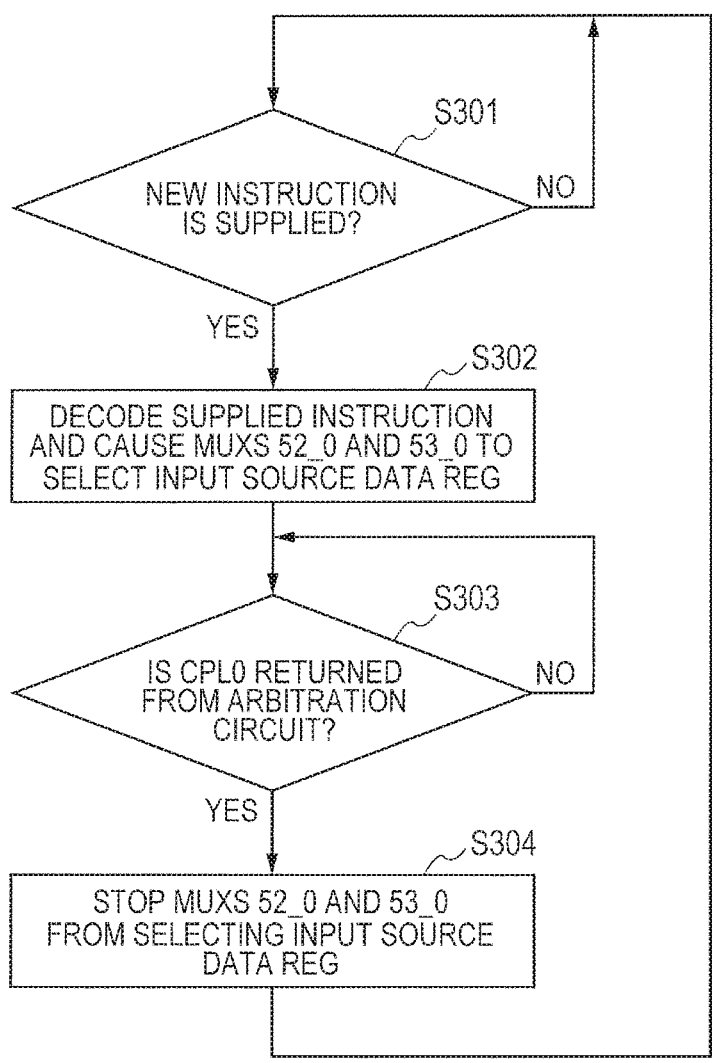
FIG. 8 is a flow chart showing an operation procedure for an input REG selection circuit.

FIG. 8 is a flow chart showing an operation procedure for the input REG selection circuit of FIG. 4.

First, in the case where a new instruction is supplied thereto from the program read control circuit 66 (YES in Step S301), the input REG selection circuit 63 decodes the supplied instruction and outputs the first input selection signal DINa_sel to the MUX 52_0 based on the result of the decoding. On the other hand, the input REG selection circuit 64 decodes the instruction and outputs the second input selection signal DINb_sel to the MUX 53_0 based on the result of the decoding. However, when the instruction is the SFT, the input REG selection circuit 64 does not output the second input selection signal DINb_sel (Step S302).

When receiving the completion signal CPL0 from the arbitration circuit 4 (YES in Step S303), the input REG selection circuit 63 stops outputting the first input selection signal DINa_sel to the MUX 52_0, while the input REG selection circuit 64 stops outputting the second input selection signal DINb_sel to the MUX 53_0 (Step S304).

(Operation of Output REG Selection Circuit)

Figure 9:
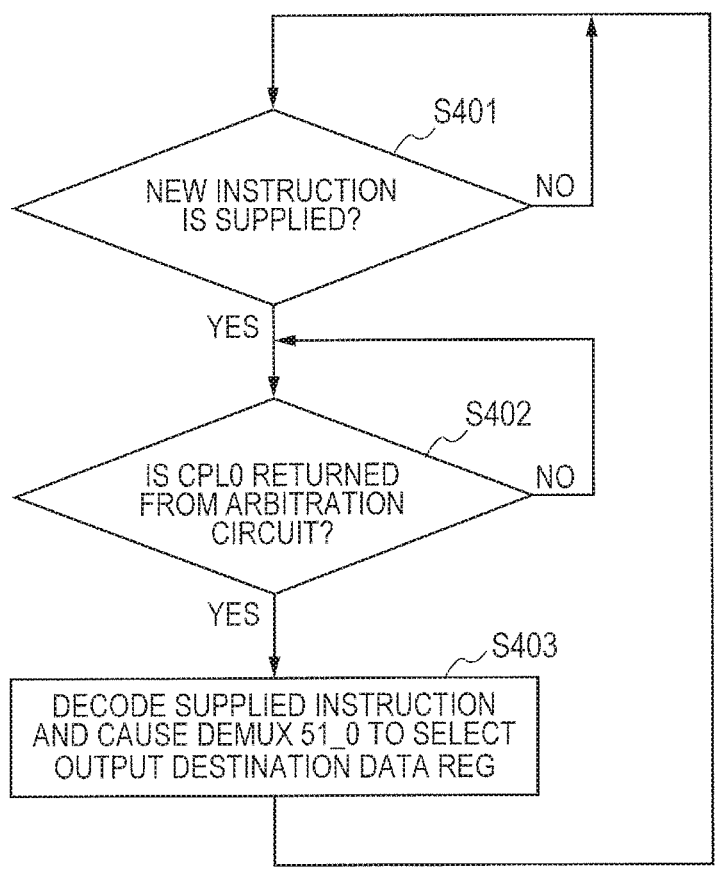
FIG. 9 is a flow chart showing an operation procedure for an output REG selection circuit.

FIG. 9 is a flow chart showing an operation procedure for the output REG selection circuit of FIG. 4.

First, in the case where a new instruction is supplied thereto from the program control circuit 66 (YES in Step S401) and in the case of receiving the completion signal CPL0 from the arbitration circuit 4 (YES in Step S42), the output REG selection circuit 62 decodes the supplied instruction. The output REG selection circuit 62 outputs the output selection signal DOUT_sel to the logical AND circuit 61 based on the result of the decoding only during the period during which it receives the completion signal CPL0. The logical AND circuit 61 outputs the selection signal SEL to the DEMUX 51_0 (Step S403).

(Operation of Reception Response Unit)

Figure 10:
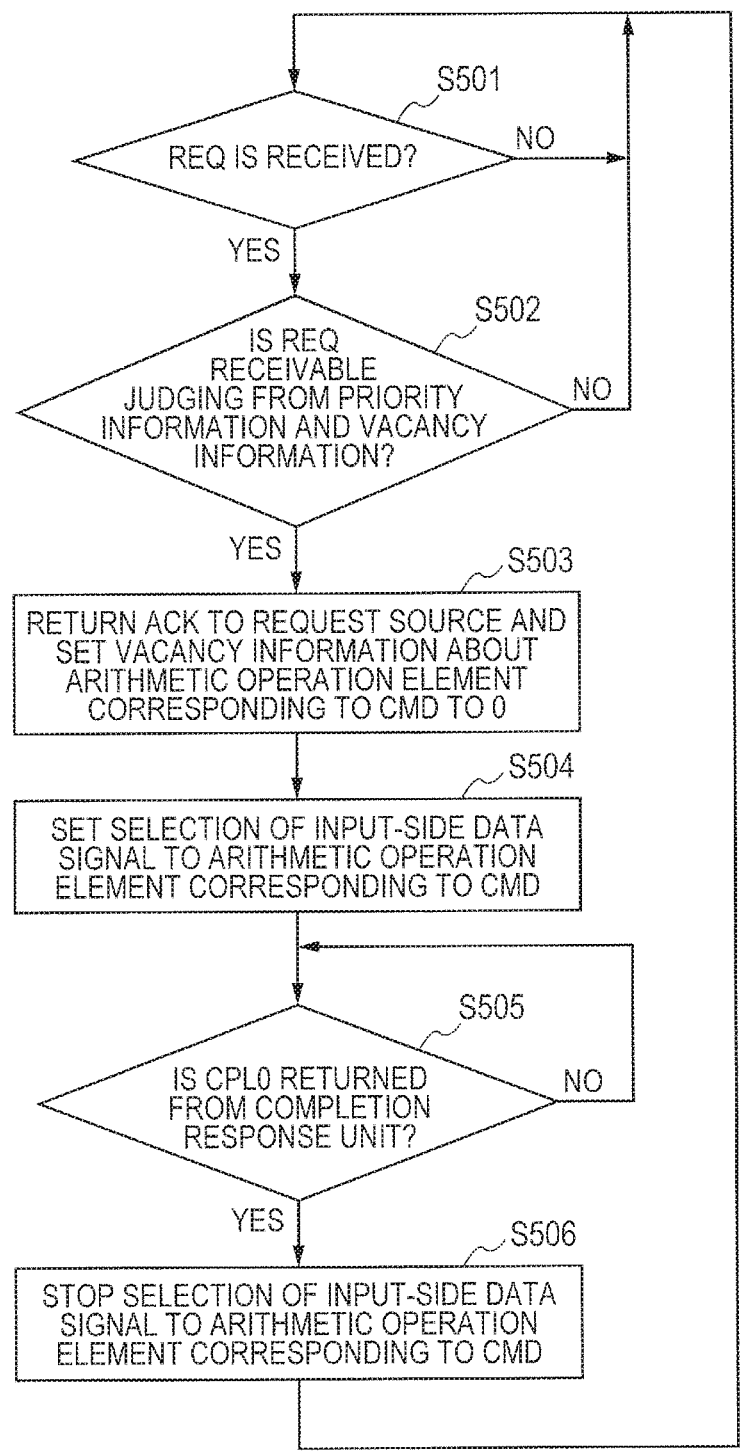
FIG. 10 is a flow chart showing an operation procedure for a reception response unit.

FIG. 10 is a flow chart showing an operation procedure for the reception response unit of FIG. 3.

Referring to FIG. 10, in the case of receiving the arithmetic operation request signal REQ0 and/or REQ1 (YES in Step S501), the reception response unit 31 refers to the priority information table and the vacancy information table and determines whether or not the arithmetic operation request is receivable.

When the arithmetic operation request is receivable (YES in Step S502), the reception response unit 31 returns a response signal ACKi to a source arithmetic operation sequence control unit i (i=0 or 1) from which the receivable request is sent. The reception response unit 31 sets vacancy information about the arithmetic operation element in the vacancy information table which is indicated by the arithmetic operation type signal CMDi to "0" indicating the in-use state. Also, the reception response unit 31 outputs the arithmetic operation type signal CMDi to the completion response unit 32 (Step S503).

The reception response unit 31 instructs any of the MUXs 38 to 42 to output a first data item DINia and a second data item DINib which are output from the arithmetic operation sequence control unit i to the one of the arithmetic operation elements 33 to 37 which is indicated by the arithmetic operation type signal CMDi (Step S504).

In the case where the completion response unit 32 has returned a completion signal CPLi to the arithmetic operation sequence control unit i (YES in Step S505), the reception response unit 31 ends the instruction to any of the MUXs 38 to 42 described above (Step S506).

(Operation of Completion Response Unit)

Figure 11:
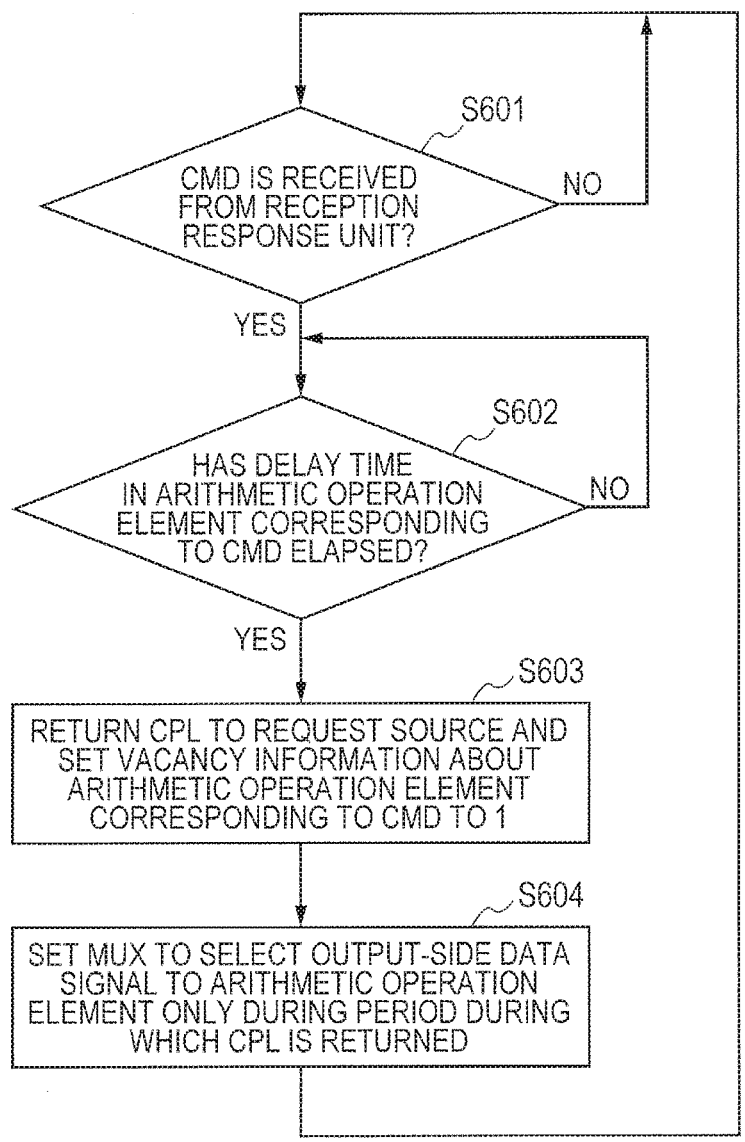
FIG. 11 is a flow chart showing an operation procedure for a completion response unit.

FIG. 11 is a flow chart showing an operation procedure for the completion response unit of FIG. 3.

Referring to FIG. 11, in the case where the arithmetic operation type signal CMDi is sent from the reception response unit 31, the completion response unit 32 refers to the delay information table and specifies a delay time in the arithmetic operation element indicated by the arithmetic operation type signal CMDi. When the specified delay time has elapsed (YES in Step S602), the completion response unit 32 returns the completion signal CPLi to the arithmetic operation sequence control unit i. Also, the completion response unit 32 sets the vacancy information about the arithmetic operation element shown by the arithmetic operation type signal CMDi to "1" indicating the out-of-use state (Step S603).

The completion response unit 32 instructs the one of the MUXs 43 and 44 which corresponds to the arithmetic operation sequence control unit i to selectively receive an output from the arithmetic operation element indicated by the arithmetic operation type signal CMDi only during the period during which the completion signal CPLi is output (Step S604).

(Example)

Next, a description will be given of a specific example of the operation of the signal processing circuit 80 of the present embodiment. Here, the description will be given to the case where the signal processing circuit 80 executes a fourth-order filtering process.

FIG. 12A is a view showing an example of data stored in the data REG #0 to data REG #4 of each of the data REG groups 55_0 and 55_1.

In the data REG #0, a data item X[i-0] at a time i is stored. In the data REG #1, a data item X[i-1] at a time (i-1) is stored. In the data REG #2, a data item X[i-2] at a time (i-2) is stored. In the data REG #3, a data item X[i-3] at a time (i-3) is stored. In the data REG #4, "0" is stored.

FIG. 12B is a view showing a group of instructions for executing the fourth-order FIR filtering process.

Referring to FIGS. 12A and 12B, in the instruction RAMs 54_0 and 54_1, first to ninth instructions for the fourth-order FIR filtering process are stored. The first instruction shows that the arithmetic operation type is the SFT (2-bit right shift), the first input source data register is the data REG #0, and the output destination data register is the data register #0. The second instruction shows that the arithmetic operation type is the ADD (addition), the first input source data register is the data REG #0, the second input source data register is the data REG #4, and the output destination data register is the data register #4. The third instruction shows that the arithmetic operation type is the SFT (2-bit right shift), the first input source data register is the data REG #1, and the output destination data register is the data register #1. The fourth instruction shows that the arithmetic operation type is the ADD (addition), the first input source data register is the data REG #1, the second input source data register is the data REG #4, and the output destination data register is the data register #4. The fifth instruction shows that the arithmetic operation type is the SFT, the first input source data register is the data REG #2, and the output destination data register is the data register #2. The sixth instruction shows that the arithmetic operation type is the ADD (addition), the first input source data register is the data REG #2, the second input source data register is the data REG #4, and the output destination data register is the data register #4. The seventh instruction shows that the arithmetic operation type is the SFT, the first input source data register is the data REG #3, and the output destination data register is the data register #3. The eighth instruction shows that the arithmetic operation type is the ADD (addition), the first input source data register is the data REG #3, the second input source data register is the data REG #4, and the output destination data register is the data register #4. The ninth instruction is the HALT instruction showing the end of the FIR filtering process.

Figure 13:
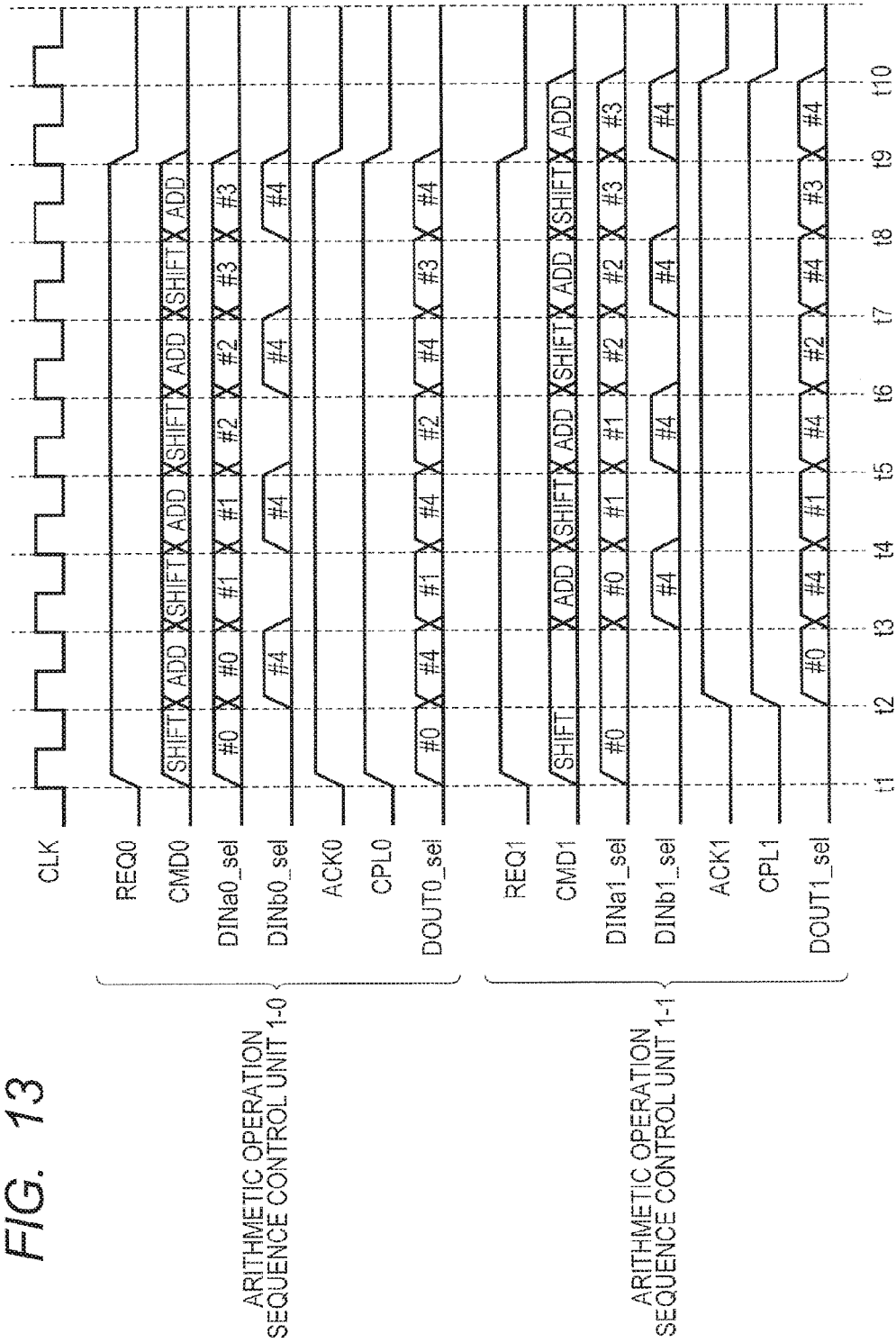
FIG. 13 is a time chart when each of two arithmetic operation sequence control units executes the group of instructions for the fourth-order FIR filtering process shown in FIG. 12.

FIG. 13 is a time chart when each of the two arithmetic operation sequence control units executes the group of instructions for the fourth-order FIR filtering process shown in FIG. 12.

Referring to FIG. 13, at the time t1, the arithmetic operation sequence control unit 1-0 reads the first instruction stored in the instruction RAM 54_0 and shown in FIG. 12B and outputs, to the arbitration circuit 4, the arithmetic operation request signal REQ0, the SFT (2-bit right shift) as the arithmetic operation type signal CMD0, and a signal specifying the data REG #0 as the first input selection signal DINa0_sel. At the same time, the arithmetic operation sequence control unit 1-1 reads the first instruction stored in the instruction RAM 54_1 and shown in FIG. 12B and outputs, to the arbitration circuit 4, the arithmetic operation request signal REQ1, the SFT (2-bit right shift) as the arithmetic operation type signal CMD1, and a signal specifying the data REG #0 as the first input selection signal DINa1_sel.

Upon simultaneously receiving the two arithmetic operation request signals REQ0 and REQ1, the reception response unit 31 in the arbitration circuit 4 refers to the arithmetic operation type signals CMD0 and CMD1, the priority information table, and the vacancy information table and determines which one of the instructions from the two arithmetic operation sequence control units is to be received or that neither of the instructions is to be received. In this example, it is assumed that each of the arithmetic operation type signals CMD0 and CMD1 is the SFT, the vacancy information table shows that the shift operation element 33 is out of use, and the priority information table shows that the arithmetic operation sequence control unit 1-0 has a higher priority. In such a case, the reception response unit 31 determines that the instruction from the arithmetic operation sequence control unit 1-0 is receivable and returns the response signal ACK0 to the arithmetic operation sequence control unit 1-0. On the other hand, the completion response unit 32 refers to the delay information table, specifies that the SFT is the arithmetic operation without delay, and immediately returns the completion signal CPL0 to the arithmetic operation sequence control unit 1-0.

At the time t2, the arithmetic operation sequence control unit 1-0 reads the second instruction stored in the instruction RAM 54_0 and shown in FIG. 12B. The arithmetic operation sequence control unit 1-0 receives the response signal ACK0 and the completion signal CPL0. However, since the second instruction is not the HALT instruction, the arithmetic operation sequence control unit 1-0 does not stop outputting the arithmetic operation request signal REQ0. The arithmetic operation sequence control unit 1-0 outputs, to the arbitration circuit 4, the ADD as the arithmetic operation type signal CMD0, a signal specifying the data REG #0 as the first input selection signal DINa0_sel, and a signal specifying the data REG #4 as the second input selection signal DINb0_sel. The arithmetic operation sequence control unit 1-1 continues to output, to the arbitration circuit 4, the arithmetic operation request signal REQ1, the arithmetic operation type signal CMD1 (SFT), and the first input selection signal DINa1_sel (specifying the data REG #0). Upon simultaneously receiving the two arithmetic operation request signals REQ0 and REQ1, the reception response unit 31 in the arbitration circuit 4 refers to the arithmetic operation type signals CMD0 and CMD1, the priority information table, and the vacancy information table and determines which one of the instructions from the two arithmetic operation sequence control units is to be received or that neither of the instructions is to be received. In this example, the arithmetic operation type signals CMD0 and CMD1 are the ADD and the SFT, and the vacancy information table shows that the shift operation element 33 is out of and the adder 34 is out of use. The reception response unit 31 determines that the instructions from the arithmetic operation sequence control units 1-0 and 1-1 are receivable, continues to return the response signal ACK0 to the arithmetic operation sequence control unit 1-0, and returns the response signal ACK1 to the arithmetic operation sequence control unit 1-1. The completion response unit 32 refers to the delay information table, specifies that each of the SFT and the ADD is the arithmetic operation without delay, continues to return the completion signal CPL0 to the arithmetic operation sequence control unit 1-0, and returns the completion signal CPL1 to the arithmetic operation sequence control unit 1-1.

At the time t3, the arithmetic operation sequence control unit 1-0 reads the third instruction stored in the instruction RAM 54_0 and shown in FIG. 12B. The arithmetic operation sequence control unit 1-0 receives the response signal ACK0 and the completion signal CPL0. However, since the third instruction is not the HALT instruction, the arithmetic operation sequence control unit 1-0 does not stop outputting the arithmetic operation request signal REQ0. The arithmetic operation sequence control unit 1-0 outputs, to the arbitration circuit 4, the SFT as the arithmetic operation type signal CMD0 and a signal specifying the data REG #1 as the first input selection signal DINa0_sel. The arithmetic operation sequence control unit 1-1 reads the second instruction stored in the instruction RAM 54_1 and shown in FIG. 12B. The arithmetic operation sequence control unit 1-1 receives the response signal ACK1 and the completion signal CPL1. However, since the second instruction is not the HALT instruction, the arithmetic operation sequence control unit 1-1 does not stop outputting the arithmetic operation request signal REQ1. The arithmetic operation sequence control unit 1-1 outputs, to the arbitration circuit 4, the ADD as the arithmetic operation type signal CMD1, a signal specifying the data REG #0 as the first input selection signal DINa1_sel, and a signal specifying the data REG #4 as the second input selection signal DINb1_sel. Upon simultaneously receiving the two arithmetic operation request signals REQ0 and REQ1, the reception response unit 31 in the arbitration circuit 4 refers to the arithmetic operation type signals CMD0 and CMD1, the priority information table, and the vacancy information table and determines which one of the instructions from the two arithmetic operation sequence control units is to be received or that neither of the instructions is to be received. In this example, the arithmetic operation type signals CMD0 and CMD1 are the SFT and the ADD, and the vacancy information table shows that the shift operation element 33 is out of use and the adder 34 is out of use. The reception response unit 31 determines that the instructions from the arithmetic operation sequence control units 1-0 and 1-1 are receivable, continues to return the response signal ACK0 to the arithmetic operation sequence control unit 1-0, and continues to return the response signal ACK1 to the arithmetic operation sequence control unit 1-1. The completion response unit 32 refers to the delay information table, specifies that each of the SFT and the ADD is the arithmetic operation without delay, continues to return the completion signal CPL0 to the arithmetic operation sequence control unit 1-0, and continues to return the completion signal CPL1 to the arithmetic operation sequence control unit 1-1.

At the time t4, the arithmetic operation sequence control unit 1-0 reads the fourth instruction stored in the instruction RAM 54_0 and shown in FIG. 12B. The arithmetic operation sequence control unit 1-0 receives the response signal ACK0 and the completion signal CPL0. However, since the fourth instruction is not the HALT instruction, the arithmetic operation sequence control unit 1-0 does not stop outputting the arithmetic operation request signal REQ0. The arithmetic operation sequence control unit 1-0 outputs, to the arbitration circuit 4, the ADD as the arithmetic operation type signal CMD0, a signal specifying the data REG #1 as the first input selection signal DINa0_sel, and a signal specifying the data REG #4 as the second input selection signal DINb0_sel. The arithmetic operation sequence control unit 1-1 reads the third instruction stored in the instruction RAM 54_1 and shown in FIG. 12B. The arithmetic operation sequence control unit 1-1 receives the response signal ACK1 and the completion signal CPL1. However, since the third instruction is not the HALT instruction, the arithmetic operation sequence control unit 1-1 does not stop outputting the arithmetic operation request signal REQ1. The arithmetic operation sequence control unit 1-1 outputs, to the arbitration circuit 4, the SFT as the arithmetic operation type signal CMD1 and a signal specifying the data REG #1 as the first input selection signal DINa1_sel. Upon simultaneously receiving the two arithmetic operation request signals REQ0 and REQ1, the reception response unit 31 in the arbitration circuit 4 refers to the arithmetic operation type signals CMD0 and CMD1, the priority information table, and the vacancy information table and determines which one of the instructions from the two arithmetic operation sequence control units is to be received or that neither of the instructions is to be received. In this example, the arithmetic operation type signals CMD0 and CMD1 are the ADD and the SFT, and the vacancy information table shows that the shift operation element 33 is out of use and the adder 34 is out of use. The reception response unit 31 determines that the instructions from the arithmetic operation sequence control units 1-0 and 1-1 are receivable, continues to return the response signal ACK0 to the arithmetic operation sequence control unit 1-0, and continues to return the response signal ACK1 to the arithmetic operation sequence control unit 1-1. The completion response unit 32 refers to the delay information table, specifies that each of the SFT and the ADD is the arithmetic operation without delay, continues to return the completion signal CPL0 to the arithmetic operation sequence control unit 1-0, and continues to return the completion signal CPL1 to the arithmetic operation sequence control unit 1-1.

At the time t5, the arithmetic operation sequence control unit 1-0 reads the fifth instruction stored in the instruction RAM 54_0 and shown in FIG. 12B. The arithmetic operation sequence control unit 1-0 receives the response signal ACK0 and the completion signal CPL0. However, since the fifth instruction is not the HALT instruction, the arithmetic operation sequence control unit 1-0 does not stop outputting the arithmetic operation request signal REQ0. The arithmetic operation sequence control unit 1-0 outputs, to the arbitration circuit 4, the SFT as the arithmetic operation type signal CMD0 and a signal specifying the data REG #2 as the first input selection signal DINa0_sel. The arithmetic operation sequence control unit 1-1 reads the fourth instruction stored in the instruction RAM 54_1 and shown in FIG. 12B. The arithmetic operation sequence control unit 1-1 receives the response signal ACK1 and the completion signal CPL1. However, since the fourth instruction is not the HALT instruction, the arithmetic operation sequence control unit 1-1 does not stop outputting the arithmetic operation request signal REQ1. The arithmetic operation sequence control unit 1-1 outputs, to the arbitration circuit 4, the ADD as the arithmetic operation type signal CMD1, a signal specifying the data REG #1 as the first input selection signal DINa1_sel, and a signal specifying the data REG #4 as the second input selection signal DINb1_sel. Upon simultaneously receiving the two arithmetic operation request signals REQ0 and REQ1, the reception response unit 31 in the arbitration circuit 4 refers to the arithmetic operation type signals CMD0 and CMD1, the priority information table, and the vacancy information table and determines which one of the instructions from the two arithmetic operation sequence control units is to be received or that neither of the instructions is to be received. In this example, the arithmetic operation type signals CMD0 and CMD1 are the SFT and the ADD, and the vacancy information table shows that the shift operation element 33 is out of use and the adder 34 is out of use. The reception response unit 31 determines that the instructions from the arithmetic operation sequence control units 1-0 and 1-1 are receivable, continues to return the response signal ACK0 to the arithmetic operation sequence control unit 1-0, and continues to return the response signal ACK1 to the arithmetic operation sequence control unit 1-1. The completion response unit 32 refers to the delay information table, specifies that each of the SFT and the ADD is the arithmetic operation without delay, continues to return the completion signal CPL0 to the arithmetic operation sequence control unit 1-0, and continues to return the completion signal CPL1 to the arithmetic operation sequence control unit 1-1.

At the time t6, the arithmetic operation sequence control unit 1-0 reads the sixth instruction stored in the instruction RAM 54_0 and shown in FIG. 12B. The arithmetic operation sequence control unit 1-0 receives the response signal ACK0 and the completion signal CPL0. However, since the sixth instruction is not the HALT instruction, the arithmetic operation sequence control unit 1-0 does not stop outputting the arithmetic operation request signal REQ0. The arithmetic operation sequence control unit 1-0 outputs, to the arbitration circuit 4, the ADD as the arithmetic operation type signal CMD0, a signal specifying the data REG #2 as the first input selection signal DINa0_sel, and a signal specifying the data REG #4 as the second input selection signal DINb0_sel. The arithmetic operation sequence control unit 1-1 reads the fifth instruction stored in the instruction RAM 54_1 and shown in FIG. 12B. The arithmetic operation sequence control unit 1-1 receives the response signal ACK1 and the completion signal CPL1. However, since the fifth instruction is not the HALT instruction, the arithmetic operation sequence control unit 1-1 does not stop outputting the arithmetic operation request signal REQ1. The arithmetic operation sequence control unit 1-1 outputs, to the arbitration circuit 4, the SFT as the arithmetic operation type signal CMD1 and a signal specifying the data REG #2 as the first input selection signal DINa1_sel. Upon simultaneously receiving the two arithmetic operation request signals REQ0 and REQ1, the reception response unit 31 in the arbitration circuit 4 refers to the arithmetic operation type signals CMD0 and CMD1, the priority information table, and the vacancy information table and determines which one of the instructions from the two arithmetic operation sequence control units is to be received or that neither of the instructions is to be received. In this example, the arithmetic operation type signals CMD0 and CMD1 are the ADD and the SFT, and the vacancy information table shows that the shift operation element 33 is out of use and the adder 34 is out of use. The reception response unit 31 determines that the instructions from the arithmetic operation sequence control units 1-0 and 1-1 are receivable, continues to return the response signal ACK0 to the arithmetic operation sequence control unit 1-0, and continues to return the response signal ACK1 to the arithmetic operation sequence control unit 1-1. The completion response unit 32 refers to the delay information table, specifies that each of the SFT and the ADD is the arithmetic operation without delay, continues to return the completion signal CPL0 to the arithmetic operation sequence control unit 1-0, and continues to return the completion signal CPL1 to the arithmetic operation sequence control unit 1-1.

At the time t7, the arithmetic operation sequence control unit 1-0 reads the seventh instruction stored in the instruction RAM 54_0 and shown in FIG. 12B. The arithmetic operation sequence control unit 1-0 receives the response signal ACK0 and the completion signal CPL0. However, since the seventh instruction is not the HALT instruction, the arithmetic operation sequence control unit 1-0 does not stop outputting the arithmetic operation request signal REQ0. The arithmetic operation sequence control unit 1-0 outputs, to the arbitration circuit 4, the SFT as the arithmetic operation type signal CMD0 and a signal specifying the data REG #3 as the first input selection signal DINa0_sel. The arithmetic operation sequence control unit 1-1 reads the sixth instruction stored in the instruction RAM 54_1 and shown in FIG. 12B. The arithmetic operation sequence control unit 1-1 receives the response signal ACK1 and the completion signal CPL1. However, since the sixth instruction is not the HALT instruction, the arithmetic operation sequence control unit 1-1 does not stop outputting the arithmetic operation request signal REQ1. The arithmetic operation sequence control unit 1-1 outputs, to the arbitration circuit 4, the ADD as the arithmetic operation type signal CMD1, a signal specifying the data REG #2 as the first input selection signal DINa1_sel, and a signal specifying the data REG #4 as the second input selection signal DINb1_sel. Upon simultaneously receiving the two arithmetic operation request signals REQ0 and REQ1, the reception response unit 31 in the arbitration circuit 4 refers to the arithmetic operation type signals CMD0 and CMD1, the priority information table, and the vacancy information table and determines which one of the instructions from the two arithmetic operation sequence control units is to be received or that neither of the instructions is to be received. In this example, the arithmetic operation type signals CMD0 and CMD1 are the SFT and the ADD, and the vacancy information table shows that the shift operation element 33 is out of use and the adder 34 is out of use. The reception response unit 31 determines that the instructions from the arithmetic operation sequence control units 1-0 and 1-1 are receivable, continues to return the response signal ACK0 to the arithmetic operation sequence control unit 1-0, and continues to return the response signal ACK1 to the arithmetic operation sequence control unit 1-1. On the other hand, the completion response unit 32 refers to the delay information table, specifies that each of the SFT and the ADD is the arithmetic operation without delay, continues to return the completion signal CPL0 to the arithmetic operation sequence control unit 1-0, and continues to return the completion signal CPL1 to the arithmetic operation sequence control unit 1-1.

At the time t8, the arithmetic operation sequence control unit 1-0 reads the eighth instruction stored in the instruction RAM 54_0 and shown in FIG. 12B. The arithmetic operation sequence control unit 1-0 receives the response signal ACK0 and the completion signal CPL0. However, since the eighth instruction is not the HALT instruction, the arithmetic operation sequence control unit 1-0 does not stop outputting the arithmetic operation request signal REQ0. The arithmetic operation sequence control unit 1-0 outputs, to the arbitration circuit 4, the ADD as the arithmetic operation type signal CMD0, a signal specifying the data REG #3 as the first input selection signal DINa0_sel, and a signal specifying the data REG #4 as the second input selection signal DINb0_sel. The arithmetic operation sequence control unit 1-1 reads the seventh instruction stored in the instruction RAM 54_1 and shown in FIG. 12B. The arithmetic operation sequence control unit 1-1 receives the response signal ACK1 and the completion signal CPL1. However, since the seventh instruction is not the HALT instruction, the arithmetic operation sequence control unit 1-1 does not stop outputting the arithmetic operation request signal REQ1. The arithmetic operation sequence control unit 1-1 outputs, to the arbitration circuit 4, the SFT as the arithmetic operation type signal CMD1 and a signal specifying the data REG #3 as the first input selection signal DINa1_sel. Upon simultaneously receiving the two arithmetic operation request signals REQ0 and REQ1, the reception response unit 31 in the arbitration circuit 4 refers to the arithmetic operation type signals CMD0 and CMD1, the priority information table, and the vacancy information table and determines which one of the instructions from the two arithmetic operation sequence control units is to be received or that neither of the instructions is to be received. In this example, the arithmetic operation type signals CMD0 and CMD1 are the ADD and the SFT, and the vacancy information table shows that the shift operation element 33 is out of use and the adder 34 is out of use. The reception response unit 31 determines that the instructions from the arithmetic operation sequence control units 1-0 and 1-1 are receivable, continues to return the response signal ACK0 to the arithmetic operation sequence control unit 1-0, and continues to return the response signal ACK1 to the arithmetic operation sequence control unit 1-1. On the other hand, the completion response unit 32 refers to the delay information table, specifies that each of the SFT and the ADD is the arithmetic operation without delay, continues to return the completion signal CPL0 to the arithmetic operation sequence control unit 1-0, and continues to return the completion signal CPL1 to the arithmetic operation sequence control unit 1-1.

At the time t9, the arithmetic operation sequence control unit 1-0 reads the ninth instruction stored in the instruction RAM 54_0 and shown in FIG. 12B. Since the ninth instruction is the HALT instruction, the arithmetic operation sequence control unit 1-0 stops outputting the arithmetic operation request signal REQ0. The arithmetic operation sequence control unit 1-1 reads the eighth instruction stored in the instruction RAM 54_1 and shown in FIG. 12B. The arithmetic operation sequence control unit 1-1 receives the response signal ACK1 and the completion signal CPL1. However, since the eighth instruction is not the HALT instruction, the arithmetic operation sequence control unit 1-1 does not stop outputting the arithmetic operation request signal REQ1. The arithmetic operation sequence control unit 1-1 outputs, to the arbitration circuit 4, the ADD as the arithmetic operation type signal CMD1, a signal specifying the data REG #3 as the first input selection signal DINa1_sel, and a signal specifying the data REG #4 as the second input selection signal DINb1_sel. Since the arithmetic operation request signal REQ0 is stopped, the reception response unit 31 in the arbitration circuit 4 stops outputting the response signal AKC1 and the completion signal CPL1 to the arithmetic operation sequence control unit 1-1. Upon receiving the arithmetic operation request signal REQ1, the reception response unit 31 refers to the arithmetic operation type signal CMD1, the priority information table, and the vacancy information table and determines whether or not the instruction from the arithmetic operation sequence control unit 1-1 is receivable. In this example, the arithmetic operation type signal CMD1 is the ADD, and the vacancy information table shows that the adder 34 is out of use. The reception response unit 31 determines that the instruction from the arithmetic operation sequence control unit 1-1 is receivable and continues to return the response signal ACK1 to the arithmetic operation sequence control unit 1-1. The completion response unit 32 refers to the delay information table, specifies that the ADD is the arithmetic operation without delay, and continues to return the completion signal CPL1 to the arithmetic operation sequence control unit 1-1.

At the time t10, the arithmetic operation sequence control unit 1-1 reads the ninth instruction stored in the instruction RAM 54_1 and shown in FIG. 12B. Since the ninth instruction is the HALT instruction, the arithmetic operation sequence control unit 1-1 stops outputting the arithmetic operation request signal REQ1. Since the arithmetic operation request signal REQ1 is stopped, the reception response unit 31 in the arbitration circuit 4 stops outputting the response signal ACK1 and the completion signal CPL1 to the arithmetic operation sequence control unit 1-1.

Thus, the reception of a shift operation from the arithmetic operation sequence control unit 1-1 is delayed so that the arithmetic operation requests from the arithmetic operation sequence control units 1-0 and 1-1 alternately repeat the shift operation and an addition operation. As a result, the use of the adder 34 does not coincide with the use of the shift operation element 33, and the fourth-order FIR filtering process is completed twice in nine cycles.

Thus, according to the present embodiment, when the plurality of types of digital signal processing are executed in parallel, by executing the arithmetic operations in the common arithmetic operation element, a circuit area can be reduced. Even when calls for the same arithmetic operation element simultaneously occur, through simultaneous operation of the plurality of arithmetic operation sequence control units, it is possible to arbitrate the competition between the sequence control units.

Second Embodiment

In the first embodiment, by reducing the number of the arithmetic operation elements to be mounted, an increase in circuit area can be reduced. However, the problem may arise that request calls for the arithmetic operation element from the plurality of arithmetic operation sequence control units frequently compete against each other and the arithmetic operation sequence control units are frequently forced to wait by each other. In a second embodiment, the number of arithmetic operation elements to be mounted is increased to increase the number of arithmetic operations which can be simultaneously processed.

Figure 14:
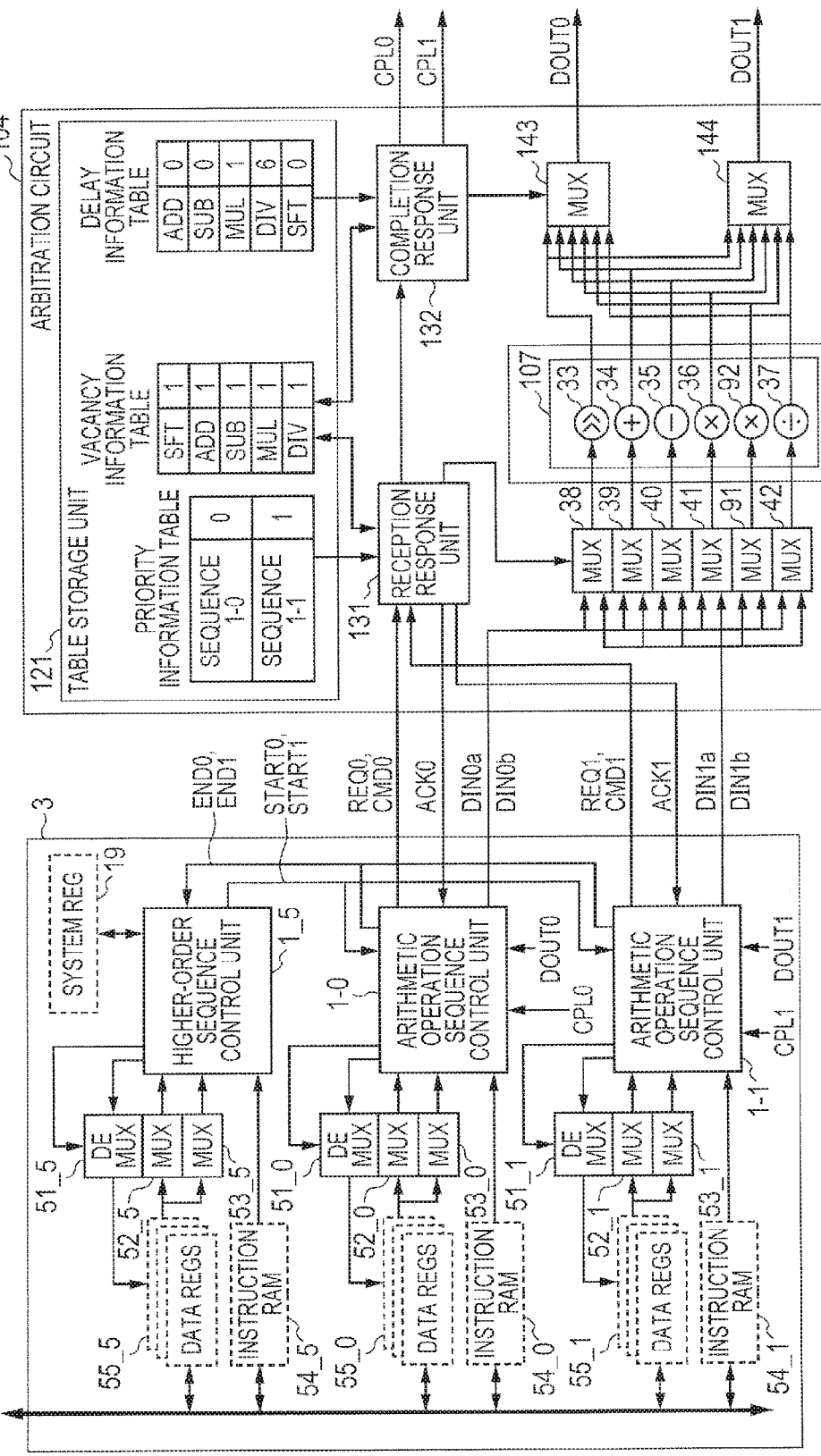
FIG. 14 is a view showing the details of the signal processing circuit of a second embodiment.

FIG. 14 is a view showing the details of the signal processing circuit of the second embodiment.

A signal processing circuit 81 differs from the signal processing circuit 80 of the first embodiment in the following point.

For each arithmetic operation type in the first group, a plurality of common arithmetic operation elements are provided. Here, by way of example, the arithmetic operation type in the first group is assumed to be multiplication. That is, in the second embodiment, a common arithmetic operation element 107 includes two multipliers 36 and 92. Following the addition of the multiplier 92, a MUX 91 for supplying data to the multiplier is added, and MUXs 143 and 144 are modified to receive signals from the five arithmetic operation elements 33, 34, 35, 36, 92, and 37.

The vacancy information table in a table storage unit 121 determines state values showing whether or not the arithmetic operation elements 33 to 37 and 92 are in use. When the arithmetic operation elements are in use, the state value is "0" and, when the arithmetic operation elements are out of use, the state values are "1" or "2". The state value "1" shows that one arithmetic operation element of each type is out of use, and the state value "2" shows that two arithmetic operation elements of the same type are out of use. In the example of FIG. 14, each of the state values of the shift operation element (SFT), the adder (ADD), the subtractor (SUB), and the divider (DIV) is "1" so that one shift operation element, one adder, one subtractor, and one divider are out of use. On the other hand, the state value of the multiplier (MUL) is "2" so that two multipliers are out of use.

When the arithmetic operation sequence control units 1-0 and 1-1 simultaneously generate requests for arithmetic operations of the arithmetic operation type in the first group (multiplication) and when either of the plurality of common arithmetic operation elements 36 and 92 corresponding to the arithmetic operation type is out of use, the reception response unit 131 selects either one of the arithmetic operation sequence control units 1-0 and 1-1 based on the priority information. The arbitration circuit 104 causes the common arithmetic operation element out of use to execute the arithmetic operation requested from the selected arithmetic operation sequence control unit and returns the result of the arithmetic operation to the selected arithmetic operation sequence control unit.

When the arithmetic operation type related to the arithmetic operation request is multiplication and when the state value of the vacancy information table is "2", the reception response unit 131 allocates the multiplier 36 as the arithmetic operation element to be used and updates the "state value" to "1". When the arithmetic operation type related to the arithmetic operation request is multiplication and when the state value of the vacancy information table is "1", the reception response unit 131 allocates the multiplier 92 as the arithmetic operation element to be used and updates the "state value" to "0".

Thus, according to the present embodiment, by simultaneously processing the plurality of requests for the same type of arithmetic operations, the processing time of digital signal processing implemented in each of the arithmetic operation sequence control units can be held constant. Particularly in aiming at an improvement in the accuracy of measurement using sensor elements, by reducing a load on a CPU core or the like, high-speed processing in the entire sensor system is enabled.

Third Embodiment

Figure 15:
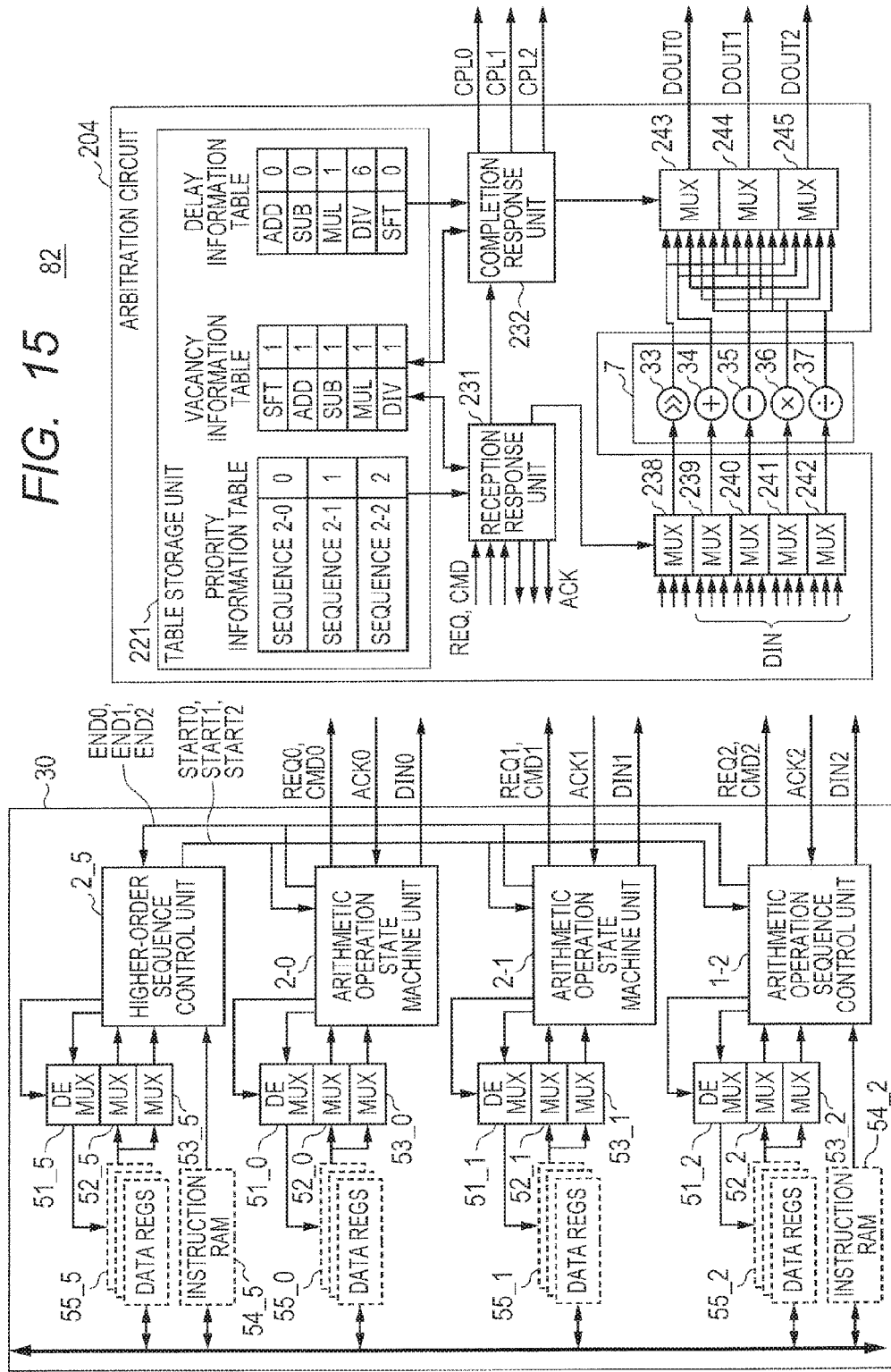
FIG. 15 is a view showing the details of the signal processing circuit of a third embodiment.

FIG. 15 is a view showing the details of the signal processing circuit of a third embodiment.

A signal processing circuit 82 includes a flow processing unit 30 and an arbitration circuit 204.

The flow processing unit 30 includes the data REG groups 55_0, 55_1, 55_2, and 55_5, instruction RAMs 54_2 and 54_5, a higher-order sequence control unit 2_5, arithmetic operation state machine units 2-0 and 2-1, an arithmetic operation sequence control unit 1-2, the DE_MUXs 51_0, 51_1, 51_2, and 51_5, the MUXs 52_0, 52_1, 52_2, 52_5, 53_0, 53_1, 53_2, and 53_5, and the system REG 19.

The flow processing unit 30 specifically differs from the flow processing unit 3 of the first embodiment in the following point.

In the third embodiment, the arithmetic operation sequence control units 1-0 and 1-1 of the first embodiment are replaced with the arithmetic operation state machine units 2-0 and 1-1. Since the content of sequence processing in the arithmetic operation state machine units 2-0 and 2-1 is fixed by a hard wire, the flow processing unit 30 of the third embodiment does not include the instruction RAMs 54_0 and 54_1 as used in the first embodiment.

On the other hand, the flow processing unit 30 of the third embodiment includes the same arithmetic operation sequence control unit 1_2 as the arithmetic operation sequence control units 1_0 and 1_1 of the first embodiment. This is for allowing, after the signal processing circuit is designed, another type of sequence processing other than the processing implemented in the arithmetic operation state machine units 2-0 and 2-1 to be added. By rewriting the instructions in the instruction RAM 54_2, the another type of sequence processing can be added.

The arbitration circuit 204 of the third embodiment is different from the arbitration circuit 4 of the first embodiment in the following point.

In the first embodiment, the two MUXs 43 and 44 are provided for outputting. By contrast, in the third embodiment, to return responses to the three sequence control units (one arithmetic operation sequence control unit and two arithmetic operation state machine units), three MUXs 243, 244, and 245 are provided.

The reception response unit 231 receives the arithmetic operation request signals REQ0, REQ1, and REQ2 and the arithmetic operation type signals CMD0, CMD1, and CMD2 from the three sequence control units.

A completion response unit 232 returns the completion signals CPL0, CPl1, and CPL2 to the three sequence control units.

The MUXs 238 to 242 respectively receive the first data items DIN0a, DIN1a, and DIN2a and the second data items DIN0b, DIN1b, and DIN2b.

Thus, in the present embodiment, general sequence processing which will not be changed is implemented with the arithmetic operation state machines to allow a reduction in circuit area.

Fourth Embodiment

In the second embodiment, by providing the plurality of common arithmetic operation elements for multiplication, even when request calls for the multipliers frequently compete, the number of arithmetic operations which can be simultaneously processed can be increased. However, the problem may arise that, depending on request calls for arithmetic operation elements from the plurality of arithmetic operation sequence control units, competitions frequently occur even for each of the arithmetic operation elements and the arithmetic operation sequence control units are frequently forced to wait by each other. In the fourth embodiment, the number of arithmetic operation elements for each type of arithmetic operation is increased to increase the number of arithmetic operations which can be simultaneously processed.

Figure 16:
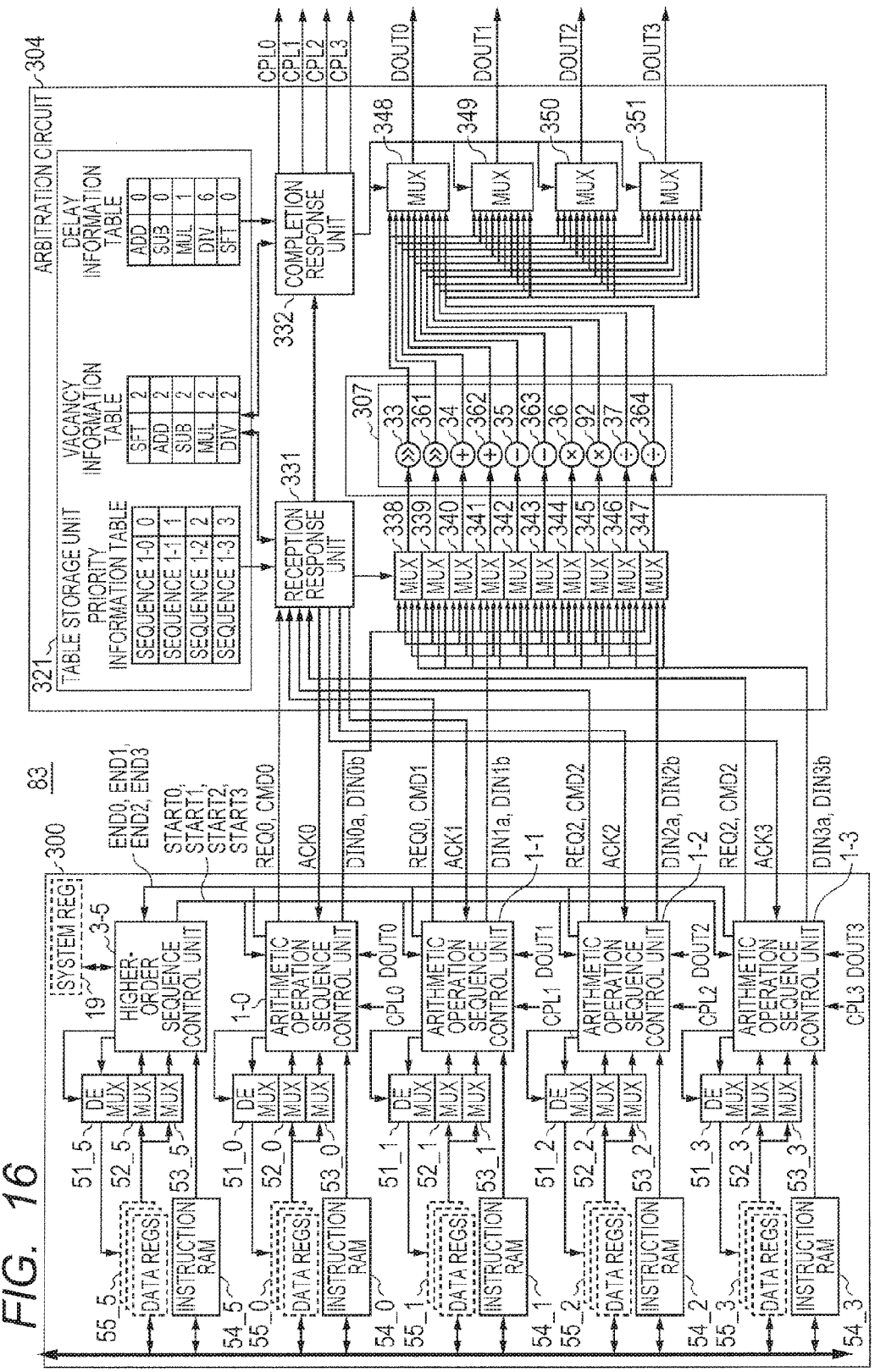
FIG. 16 is a view showing the details of the signal processing circuit of a fourth embodiment.

FIG. 16 is a view showing the details of the signal processing circuit of the fourth embodiment.

A signal processing circuit 83 includes a flow processing unit 300 and an arbitration circuit 304.

The flow processing unit 300 includes the data REG groups 55_0, 55_1, 55_2, 55_3, and 55_5, the instruction RAMS 54_0, 54_1, 54_2, 54_3, and 54_5, a higher-order sequence control unit 3_5, the arithmetic operation sequence control units 1_0, 1_1, 1_2, and 1_3, the DE_MUXs 51_0, 51_1, 51_2, 51_3, and 51_5, the MUXs 52_0, 52_1, 52_2, 52_3, 52_5, 53_0, 53_1, 53_2, 53_3, and 53_5, and the system REG 19.

In the fourth embodiment, a common arithmetic operation element 307 includes two shift operation elements 33 and 361, two adders 34 and 362, two subtractors 35 and 363, two multipliers 36 and 92, and two dividers 37 and 364.

In the fourth embodiment, in correspondence to the fact that the flow processing unit 300 includes the fourth arithmetic operation sequence control units 1-0, 1-1, 1-2, and 1-3, the arbitration circuit 304 is provided with MUXs 338, 339, 340, 341, 342, 343, 344, 345, 346, and 347 for supplying data to the ten arithmetic operation elements 33, 361, 34, 362, 35, 363, 36, 92, 37, and 364. To return responses to the four arithmetic operation sequence control units 1-0, 1-1, 1-2, and 1-3, four MUXs 348, 349, 350, and 351 are provided.

A reception response unit 331 receives the arithmetic operation request signals REQ0, REQ1, REQ2, and REQ3 and the arithmetic operation type signals CMD0, CMD1, CMD2, and CMD3 from the four arithmetic operation sequence control units.

A completion response unit 332 returns the completion signals CPL0, CPL1, CPL2, and CPL4 to the four arithmetic operation sequence control units.

The MUXs 338 to 347 respectively receive the first data items DIN0a, DIN1a, DIN2a, and DINa3 and the second data items DIN0b, DIN1b, DIN2b, and DINb3.

The vacancy information table in a table storage unit 321 determines state values showing whether or not the arithmetic operation elements 33 to 37, 92, and 361 to 364 are in use. When the arithmetic operation elements are in use, the state values are "0". When the arithmetic operation elements are out of use, the state values are "1" or "2". The state value "1" shows that one arithmetic operation element of each type is out of use, and the state value "2" shows that two arithmetic operation elements of the same type are out of use. In the example of FIG. 16, each of the state values of the shift operation element (SFT), the adder (ADD), the subtractor (SUB), the multiplier (MUL), and the divider (DIV) is "2" so that two shift operation elements, two adders, two subtractors, two multipliers, and two dividers are out of use.

When the arithmetic operation sequence control units 1-0, 1-1, 1-2, and 1-3 simultaneously generate requests for arithmetic operations of a given arithmetic operation type and when any of the plurality of common arithmetic operation elements corresponding to the arithmetic operation type is out of use, the reception response unit 331 selects among the arithmetic operation sequence control units 1-0, 1-1, 1-2, and 1-3 based on the priority information about the arithmetic operation sequence control units such that the number of the selected arithmetic operation sequence control units corresponds to the number of the arithmetic operation elements out of use. The arbitration circuit 304 causes the common arithmetic operation elements out of use to execute the arithmetic operations requested from the selected arithmetic operation sequence control units and returns the results of the arithmetic operations to the selected arithmetic operation sequence control units.

When the arithmetic operation sequence control units 1-0, 1-1, 1-2, and 1-3 simultaneously generate requests for arithmetic operations of different arithmetic operation types and when any of the plurality of common arithmetic operation elements corresponding to each of the arithmetic operation types is out of use, the reception request unit 331 selects among the arithmetic operation sequence control units 1-0, 1-1, 1-2, and 1-4 based on the priority information about the arithmetic operation sequence control units such that the number of the selected arithmetic operation sequence control units corresponds to the number of the arithmetic operation elements out of use. The arbitration circuit 304 causes the common arithmetic operation elements out of use to execute the arithmetic operations requested from the selected arithmetic operation sequence control units and returns the results of the arithmetic operations to the selected arithmetic operation sequence control units.

Thus, according to the present embodiment, by simultaneously processing the plurality of requests for the same type of arithmetic operations with regard to each of the arithmetic operation types, the processing time of digital signal processing implemented in each of the arithmetic operation sequence control units can be held more constant than in the second embodiment.

While the invention achieved by the present inventors has been specifically described heretofore based on the embodiments thereof, the present invention is not limited to the foregoing embodiments. It will be appreciated that various changes and modifications can be made in the invention within the scope not departing from the gist thereof.

What is claimed is:

1. A microcontroller comprising:
   a signal processing unit;
   a central processing unit (CPU); and
   a bus coupled to the CPU and the signal processing unit,
   wherein the signal processing unit includes a first sequencer, a second sequencer, a first instruction memory, a first program counter, an arbitration circuit and a common arithmetic unit,
   wherein on receipt of a first CPU request by the CPU, the first sequencer selects a first instruction stored in the first instruction memory based on the first program counter and requests the common arithmetic unit to execute a first request based on the first instruction,
   wherein on receipt of a second CPU request by the CPU the second sequencer requests the common arithmetic unit to execute a second request, and
   wherein the arbitration circuit selects one of the first request and the second request when the first and second requests compete against each other.

2. The microcontroller according to claim 1, further comprising:
   an A/D converter,
   wherein the signal processing unit executes a signal processing for an output data of the A/D converter.

3. The microcontroller according to claim 1,
   wherein the common arithmetic unit includes a first arithmetic unit and a second arithmetic unit, and
   wherein the arbitration circuit selects one of the first request and the second request when both the first and second requests use the first arithmetic unit at the same time.

4. The microcontroller according to claim 3, wherein the arbitration circuit selects both the first and second requests when the first request uses the first arithmetic unit and the second request uses the second arithmetic unit at the same time.

5. The microcontroller according to claim 1, wherein the common arithmetic unit includes an adder, a subtractor and a multiplier.

6. The microcontroller according to claim 1, wherein the second sequencer comprises a state machine.

7. The microcontroller according to claim 1,
   wherein the signal processing unit further includes a second instruction memory and a second program counter, and
   wherein on receipt of the second CPU request by the CPU, the second sequencer selects a second instruction stored in the second instruction memory based on the second program counter and requests the common arithmetic unit to execute a second request based on the second instruction.

* * * * *